United States Patent
Padiyar et al.

(10) Patent No.: US 12,554,820 B2
(45) Date of Patent: Feb. 17, 2026

(54) SYSTEMS AND METHODS FOR IMPROVING DATA SECURITY BY GENERATING SURROUNDING IMAGE SONIFICATION AND DYNAMICALLY ADJUSTING GRAPHICAL USER INTERFACES

(71) Applicant: BANK OF AMERICA CORPORATION, Charlotte, NC (US)

(72) Inventors: Sneha Padiyar, Maharashtra (IN); Srushti Ripan Shah, Maharashtra (IN); Priya Gupta, Maharashtra (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 21 days.

(21) Appl. No.: 18/782,414

(22) Filed: Jul. 24, 2024

(65) Prior Publication Data

US 2026/0030329 A1    Jan. 29, 2026

(51) Int. Cl.
*G06F 21/00* (2013.01)
*G06F 21/32* (2013.01)
*G06T 7/13* (2017.01)
*G06T 7/90* (2017.01)
*G10L 25/84* (2013.01)

(52) U.S. Cl.
CPC ............... *G06F 21/32* (2013.01); *G06T 7/13* (2017.01); *G06T 7/90* (2017.01); *G10L 25/84* (2013.01)

(58) Field of Classification Search
CPC ... G06F 21/32; G06T 7/13; G06T 7/90; G10L 25/84
See application file for complete search history.

(56) References Cited

U.S. PATENT DOCUMENTS

| 8,744,914 | B2 | 6/2014 | Mon et al. | |
|---|---|---|---|---|
| 9,892,732 | B1* | 2/2018 | Tian | G10L 15/24 |
| 2014/0337243 | A1* | 11/2014 | Dutt | G06Q 20/327 |
| | | | | 705/325 |
| 2015/0149354 | A1 | 5/2015 | Mccoy | |
| 2019/0243989 | A1* | 8/2019 | Kalva | H04W 12/08 |
| 2021/0397644 | A1* | 12/2021 | DeLuca | G10L 15/005 |

* cited by examiner

Primary Examiner — William A Corum, Jr.
(74) Attorney, Agent, or Firm — Moore & Van Allen PLLC; Lauren Stokes

(57) ABSTRACT

Systems, computer program products, and methods are described herein for improving data security by generating surrounding image sonification and dynamically adjusting graphical user interfaces. The present disclosure is configured to receive a data transmission request and at an authentication credential; identify a voice input, facial input data, and a physical characteristic input data; compare the voice input with a voice authentication, the facial input data with a facial authentication data, and the physical characteristic input data with a physical characteristic authentication; authenticate a user based on the comparison; receive an expected environment user input; receive at least one real-time image of the real-time geographic environment; analyze the at least one real-time image; generate a real-time geographic environment indication; transmit the real-time geographic environment indication; receive a real-time environment authentication; and authenticate the data transmission request based on the authentication of the user and the real-time environment authentication.

17 Claims, 15 Drawing Sheets

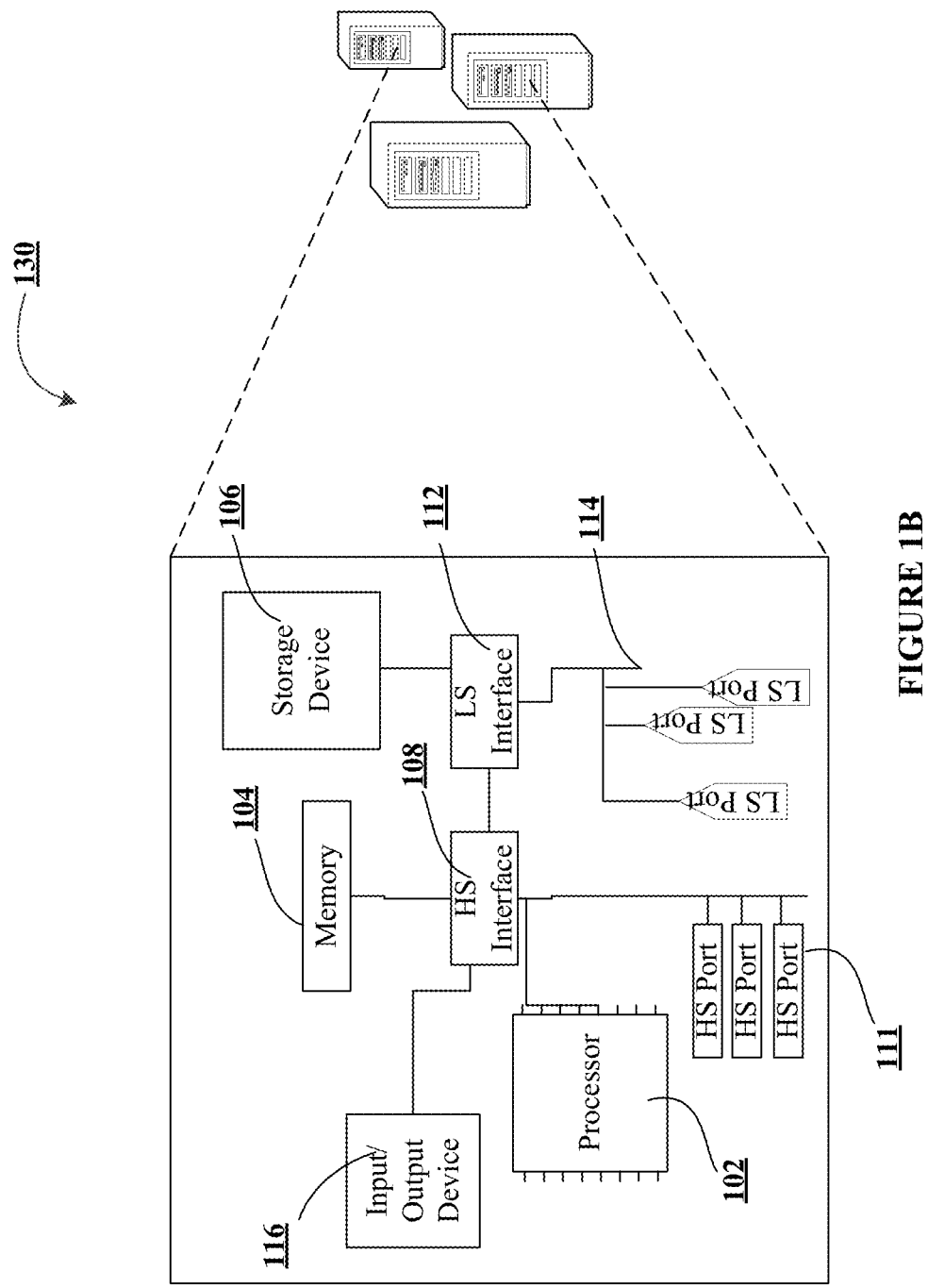

SYSTEMS AND METHODS FOR IMPROVING DATA SECURITY BY GENERATING SURROUNDING IMAGE SONIFICATION AND DYNAMICALLY ADJUSTING GRAPHICAL USER INTERFACES

TECHNOLOGICAL FIELD

Example embodiments of the present disclosure relate to improve data security by generating surrounding image sonification and dynamically adjusting graphical user interfaces.

BACKGROUND

In our current technology environment, more and more communication actions are now undertaken by users on their user devices at remote locations, rather than in an in-person location. Further, and based on these remote locations, it has become increasingly easy for bad actors to act as eavesdroppers in these telecommunications, gather secure data, and interfere in secure data transmissions. Such issues are further exacerbated when trusted users are not sure if their environments are safe from bad actors and thus, whether greater security should be given to prevent secure data misappropriations. Thus, there exists a great need for a system that can accurately, efficiently, and dynamically improve data security by generating surrounding image sonification of the current environment for a trusted user and then, based on whether the environment is trustworthy, dynamically adjust graphical user interfaces of the user's user device to prevent eavesdropping of bad actors, data misappropriation, and/or the like.

Applicant has identified a number of deficiencies and problems associated with determining safe and secure environments for data presentations and data transmissions. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for improving data security by generating surrounding image sonification and dynamically adjusting graphical user interfaces.

In one aspect, a system for improving data security by generating surrounding image sonification and dynamically adjusting graphical user interfaces. In some embodiments, the system may comprise: a memory device with computer-readable program code stored thereon; at least one processing device operatively coupled to the at least one memory device and the at least one communication device, wherein executing the computer-readable code is configured to cause the at least one processing device to: receive a data transmission request and at least one authentication credential; identify a voice input, facial input data, and a physical characteristic input data captured from a user device associated with the data transmission request; compare, based on the at least one authentication credential, the voice input with a voice authentication, the facial input data with a facial authentication data, and the physical characteristic input data with a physical characteristic authentication; authenticate a user associated with the at least one authentication credential based on the comparison; receive an expected environment user input from the user device, wherein the expected environment user input is based on a real-time geographic environment of the user device; receive at least one real-time image of the real-time geographic environment from the user device; analyze the at least one real-time image; generate, based on the analysis of the at least one real-time image, a real-time geographic environment indication of the real-time environment; transmit the real-time geographic environment indication to the user device; receive a real-time environment authentication from the user device; and authenticate the data transmission request based on the authentication of the user and based on the real-time environment authentication.

In some embodiments, the real-time geographic environment indication comprises a sonification of the at least one real-time image. In some embodiments, the sonification comprises a color sonification and a feature sonification of the at least one real-time image.

In some embodiments, executing the computer-readable code is further configured to cause the at least one processing device to: receive a real-time image user input from the user device; and update, based on the real-time image user input, the real-time geographic environment indication and focus on an object in the at least one real-time image for the real-time geographic environment indication.

In some embodiments, wherein the analysis of the at least one real-time image comprises an analysis by a trained machine learning model and a computer vision component, and wherein the trained machine learning model comprises an objection recognition of the at least one real-time image based on a low-level color recognition and a high-level edge recognition of the at least one real-time image.

In some embodiments, the real-time geographic indication comprises a crowd negative indication, and wherein executing the computer-readable code is further configured to cause the at least one processing device to allow, based on the crowd negative indication, the data transmission request.

In some embodiments, the real-time geographic indication comprises a crowd positive indication, and wherein executing the computer-readable code is further configured to cause the at least one processing device to automatically block, based on the crowd positive indication, the data transmission request.

In some embodiments, the real-time geographic indication comprises a crowd positive indication, and wherein executing the computer-readable code is further configured to cause the at least one processing device to: transmit the real-time geographic authentication based on the crowd positive indication to the user device; receive the real-time environment authentication based on the crowd positive indication, wherein the real-time environment authentication comprises a data transmission re-request from the user device; and allow the data transmission request based on the data transmission re-request.

In some embodiments, a background noise input is filtered to identify the voice input, and wherein the filtering of the background noise input comprises a natural language processing component configured with artificial intelligence which filters at least one low-frequency sound, and divides a plurality of high-frequency sounds between a plurality of speakers in the background noise input, and identify the voice input of the user.

In some embodiments, executing the computer-readable code is further configured to cause the at least one processing device to: apply the at least one authentication credential to a user interface machine learning model; determine, by the user interface machine learning model, at least one user interface preference for the at least one authentication credential, wherein the at least one user interface comprises at least one of a user interface location, user interface font, user interface size, or user interface auditory signal, and wherein the at least one user interface preference is based on historical user interfaces of a plurality of applications on the user device; and generate, by the user interface machine learning model and based on the authentication of the data transmission request and the real-time environment authentication, at least one user interface template based on the at least one user interface preference.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
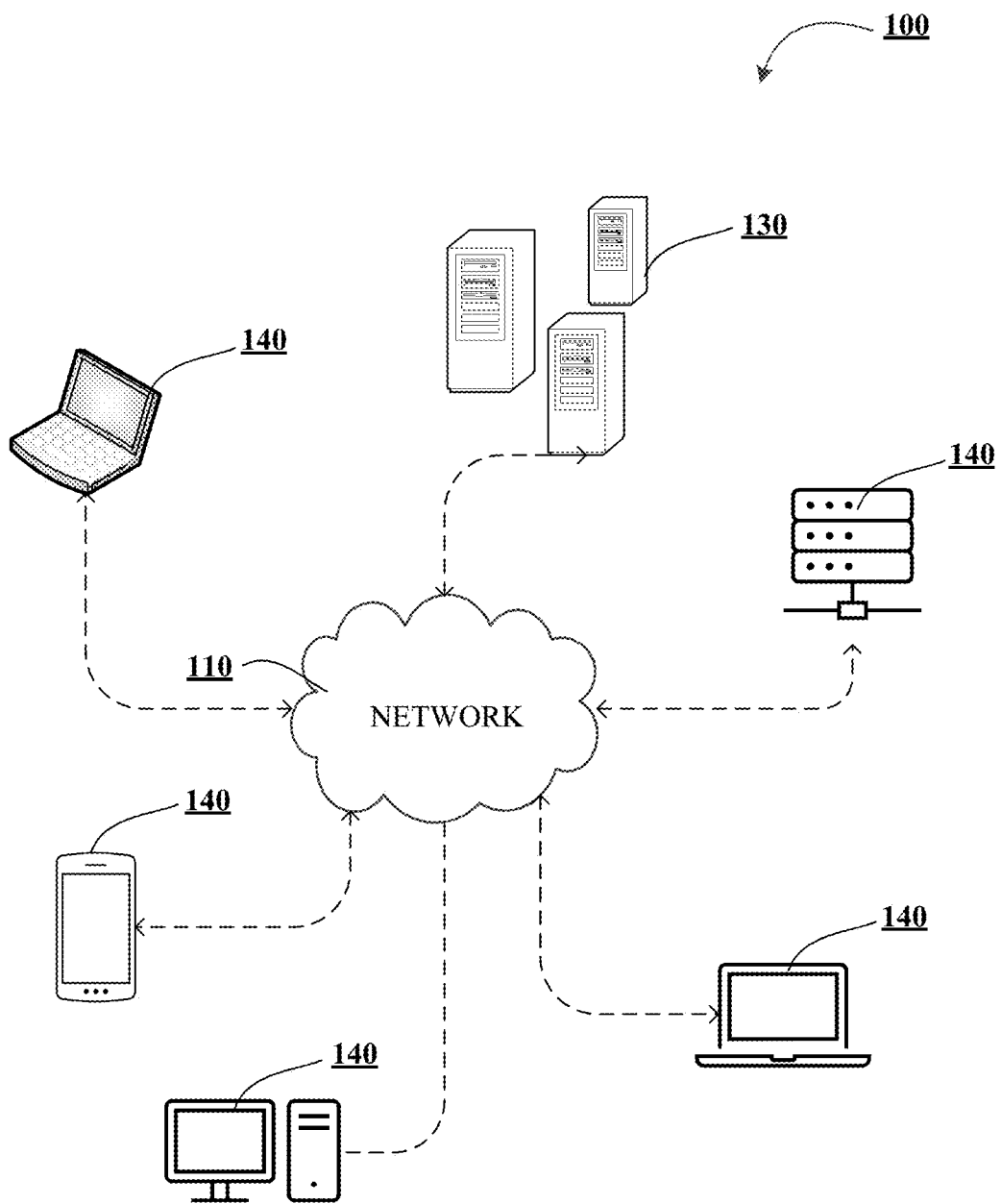
Figure 1C:
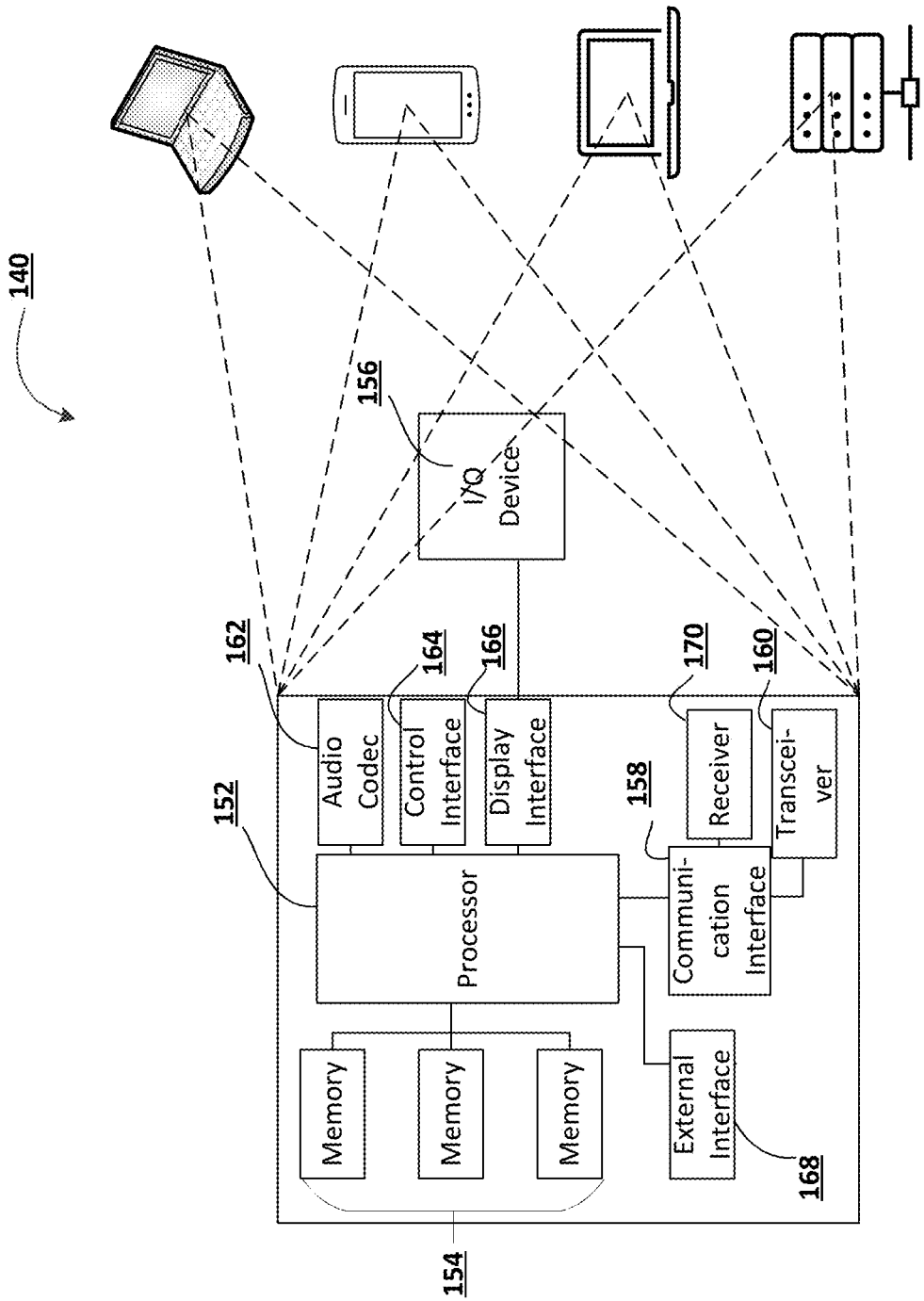
Figure 2:
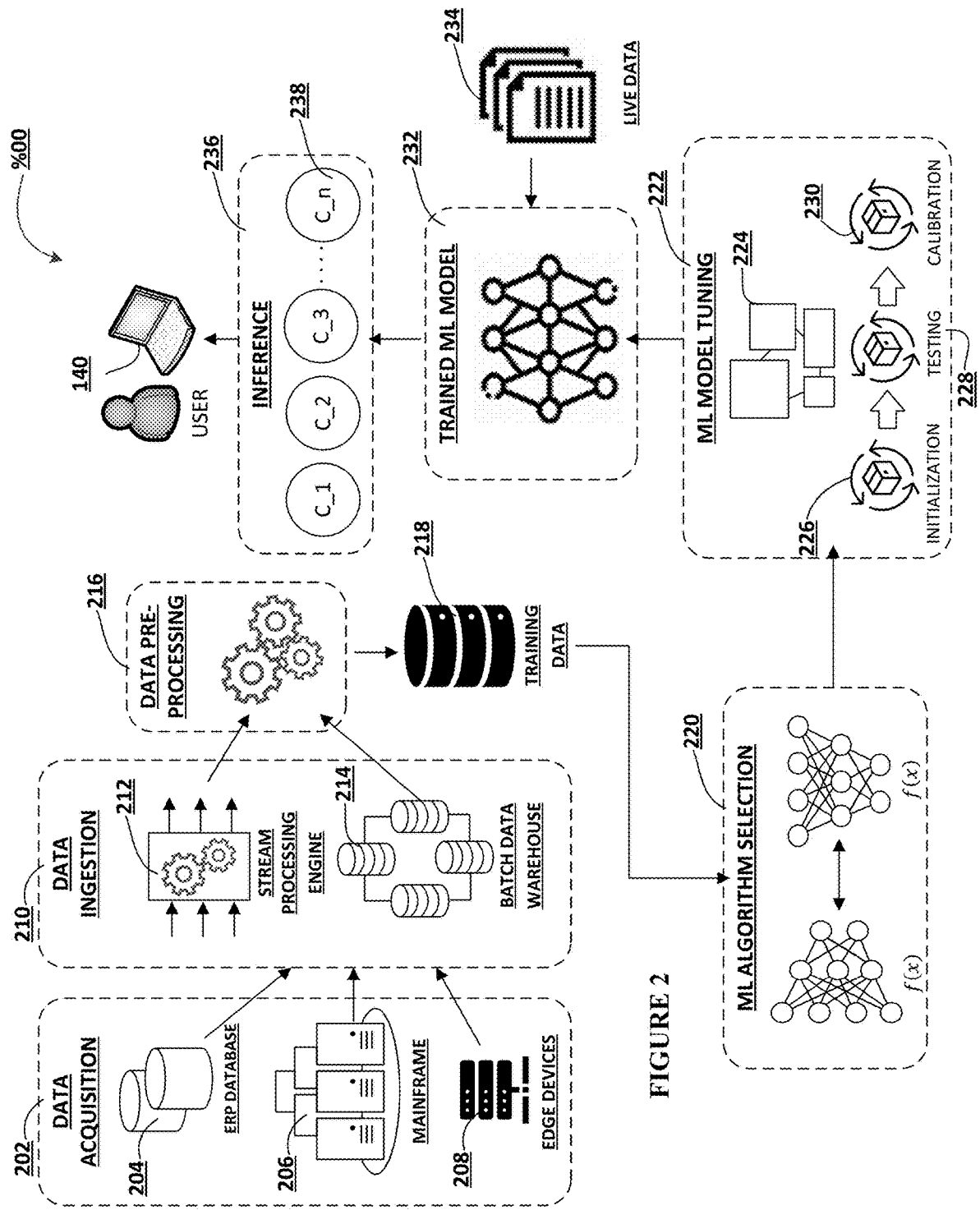
Figure 3:
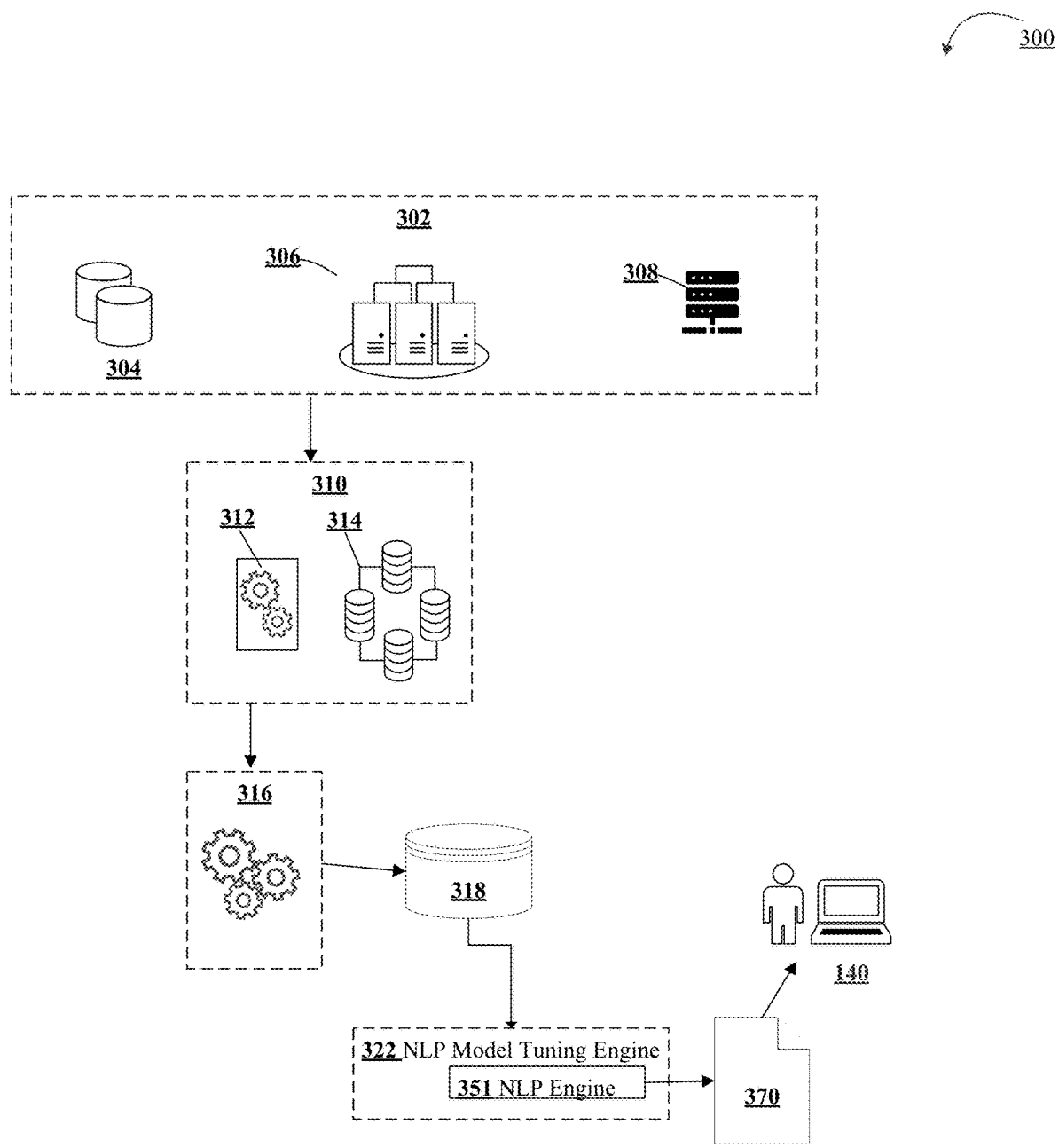
Figure 4:
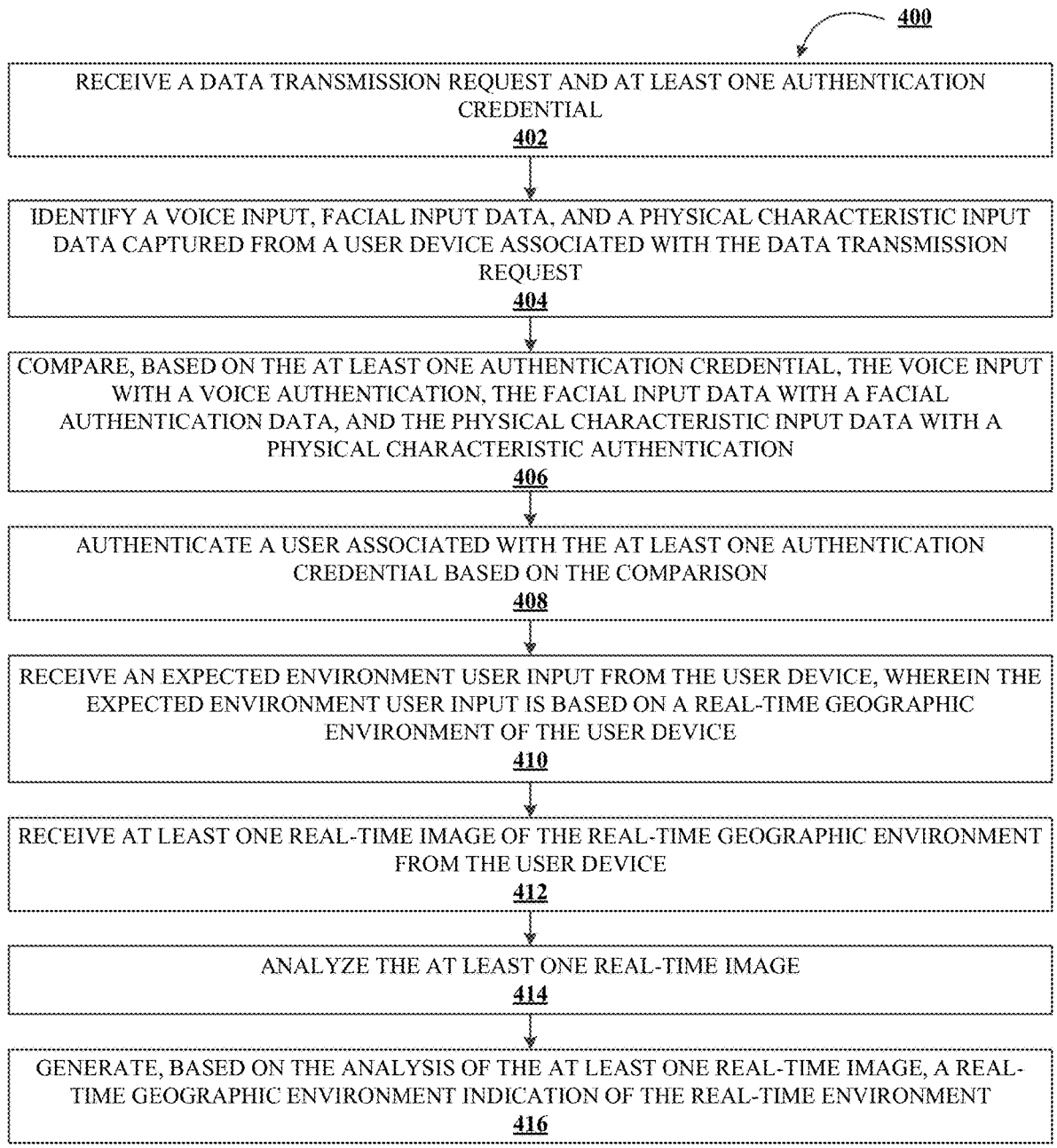
Figure 5:
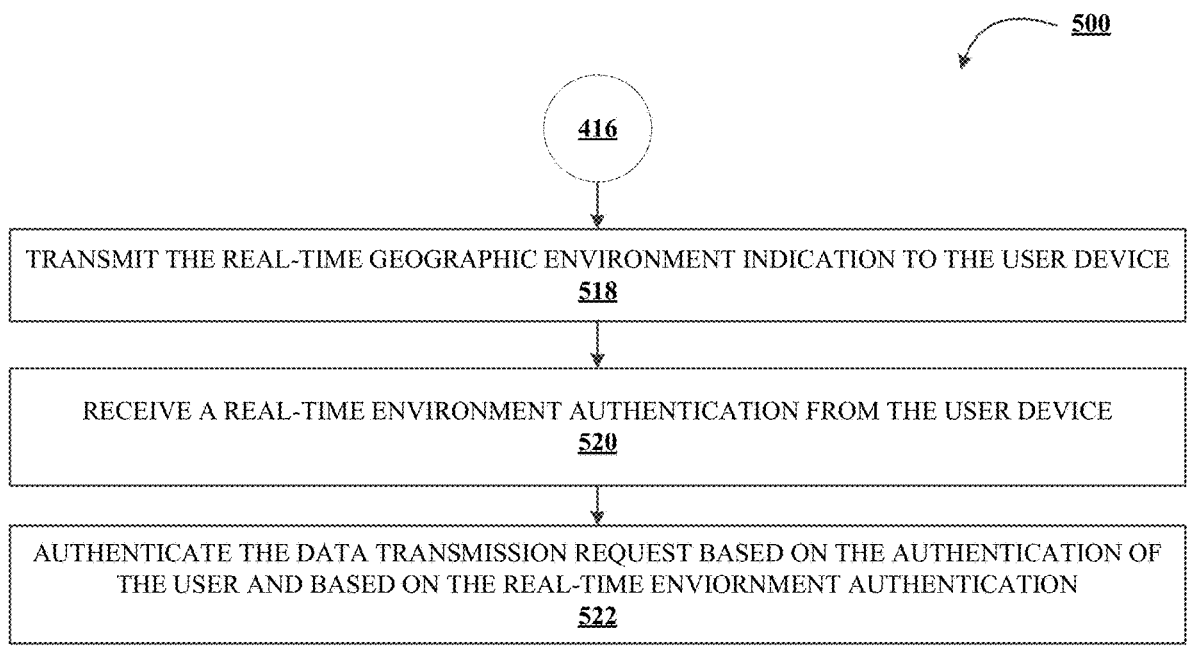
Figure 6:
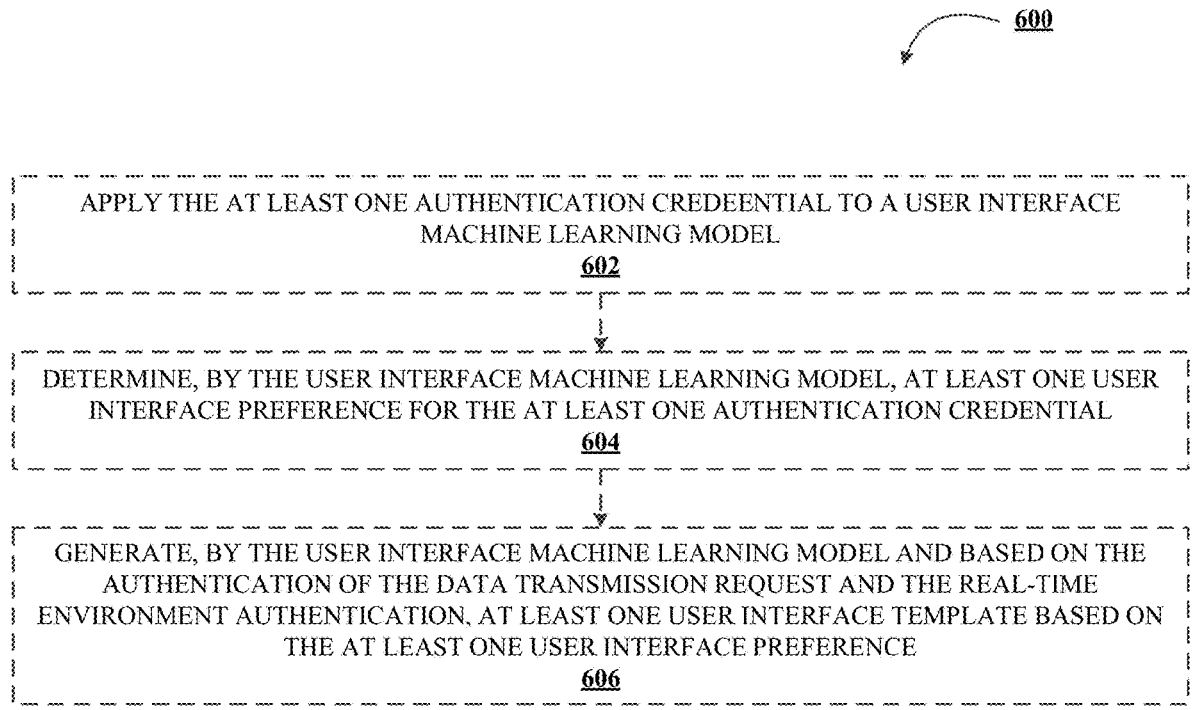
Figure 7:
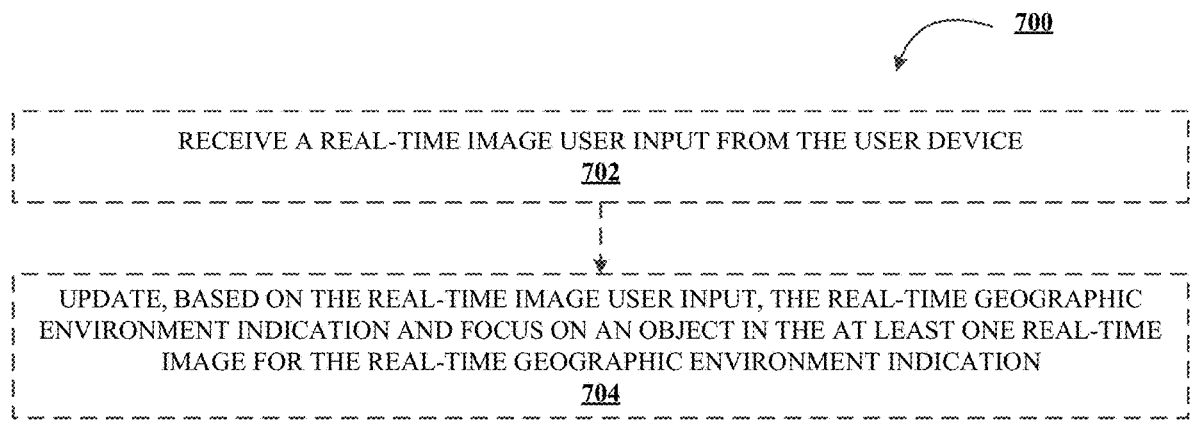
Figure 8:
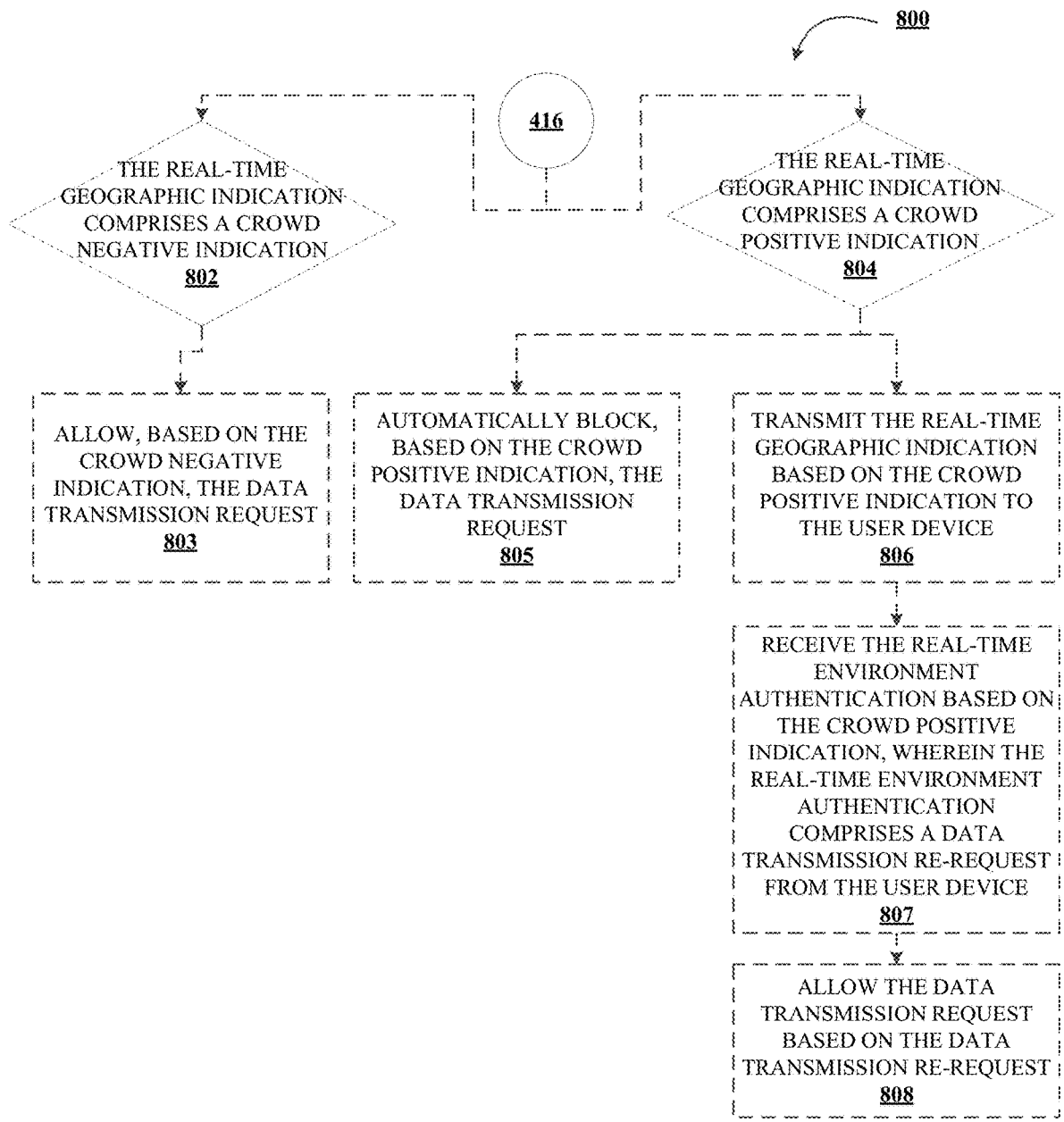
Figure 9:
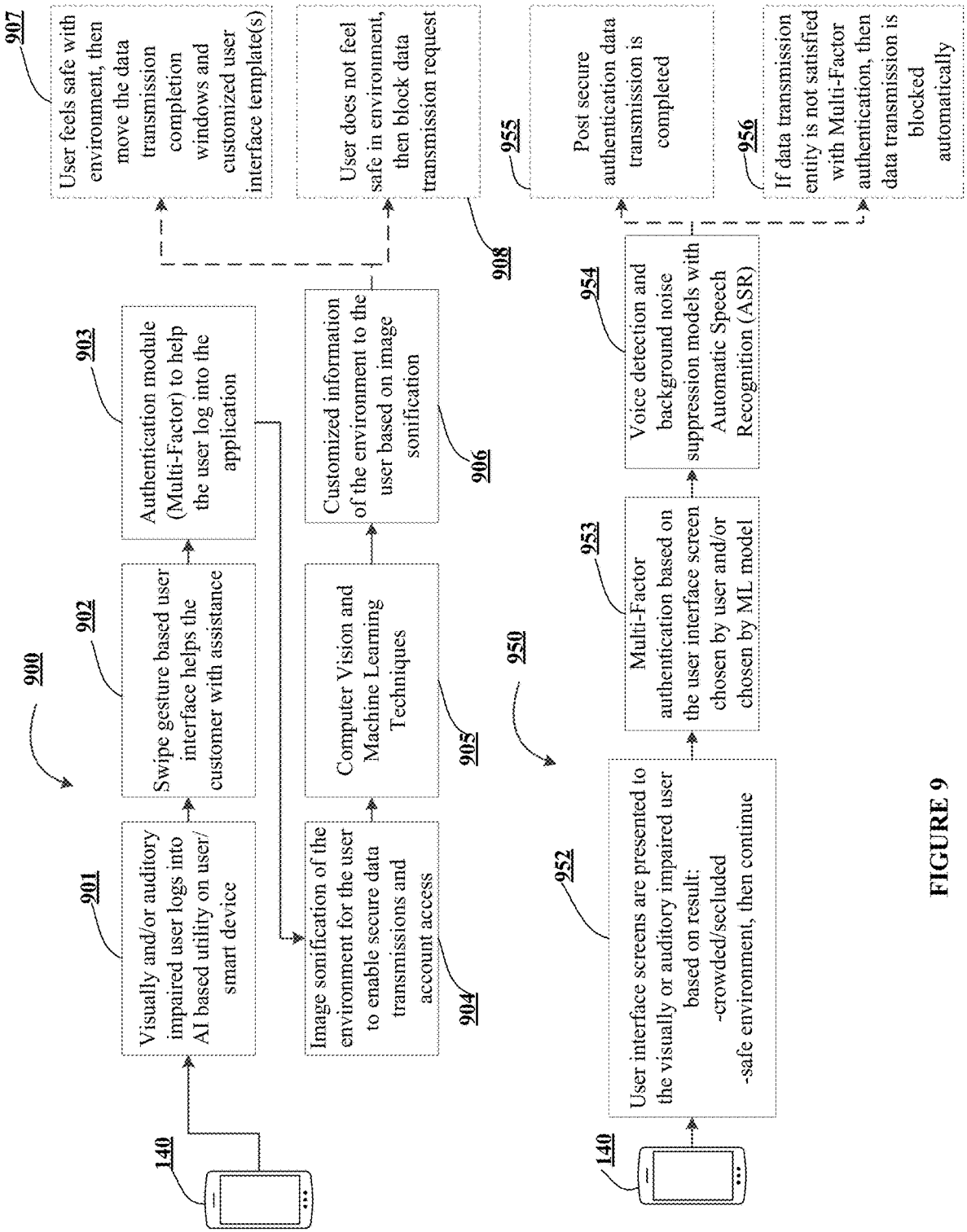
Figure 10:
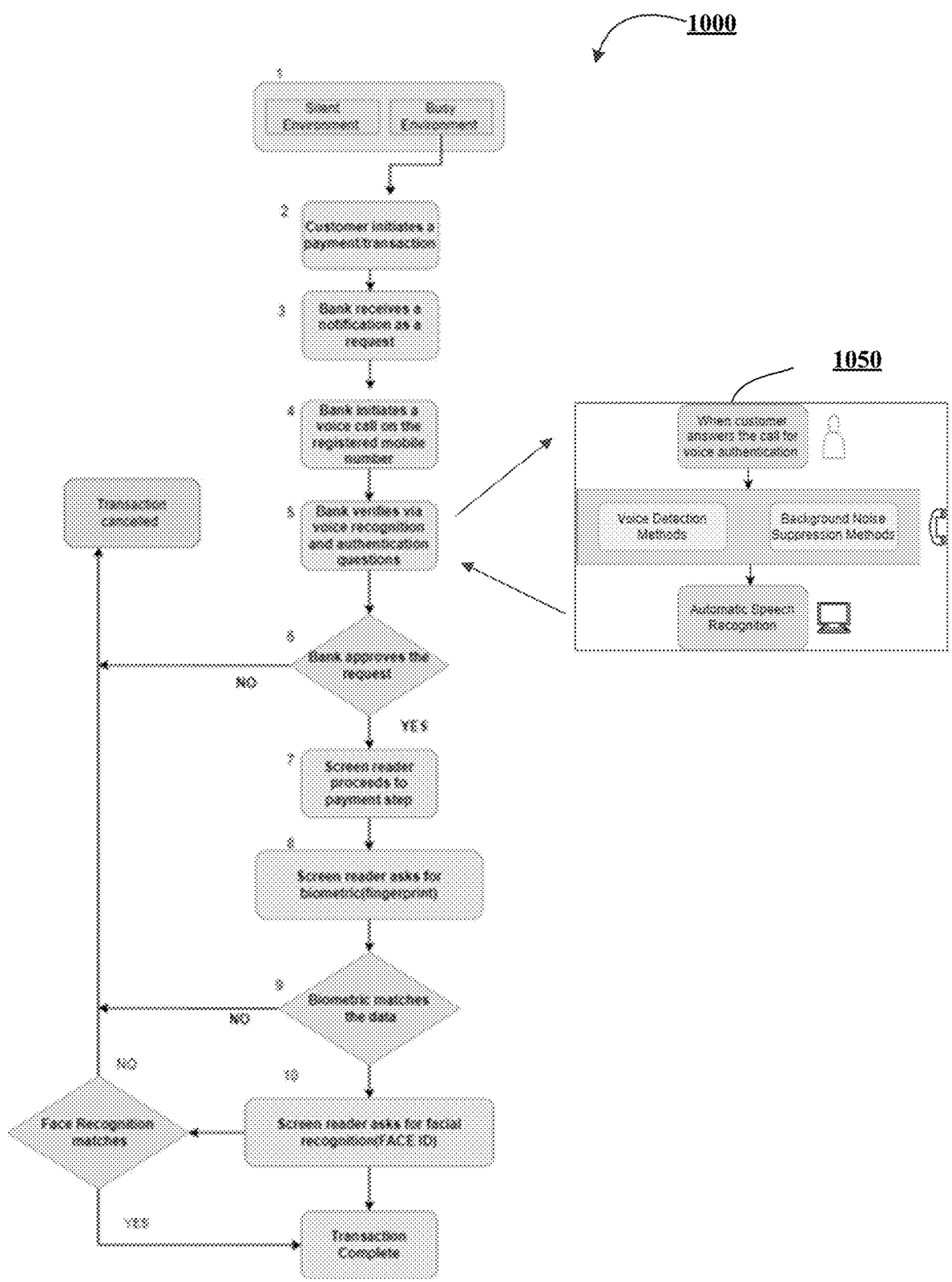
Figure 11:
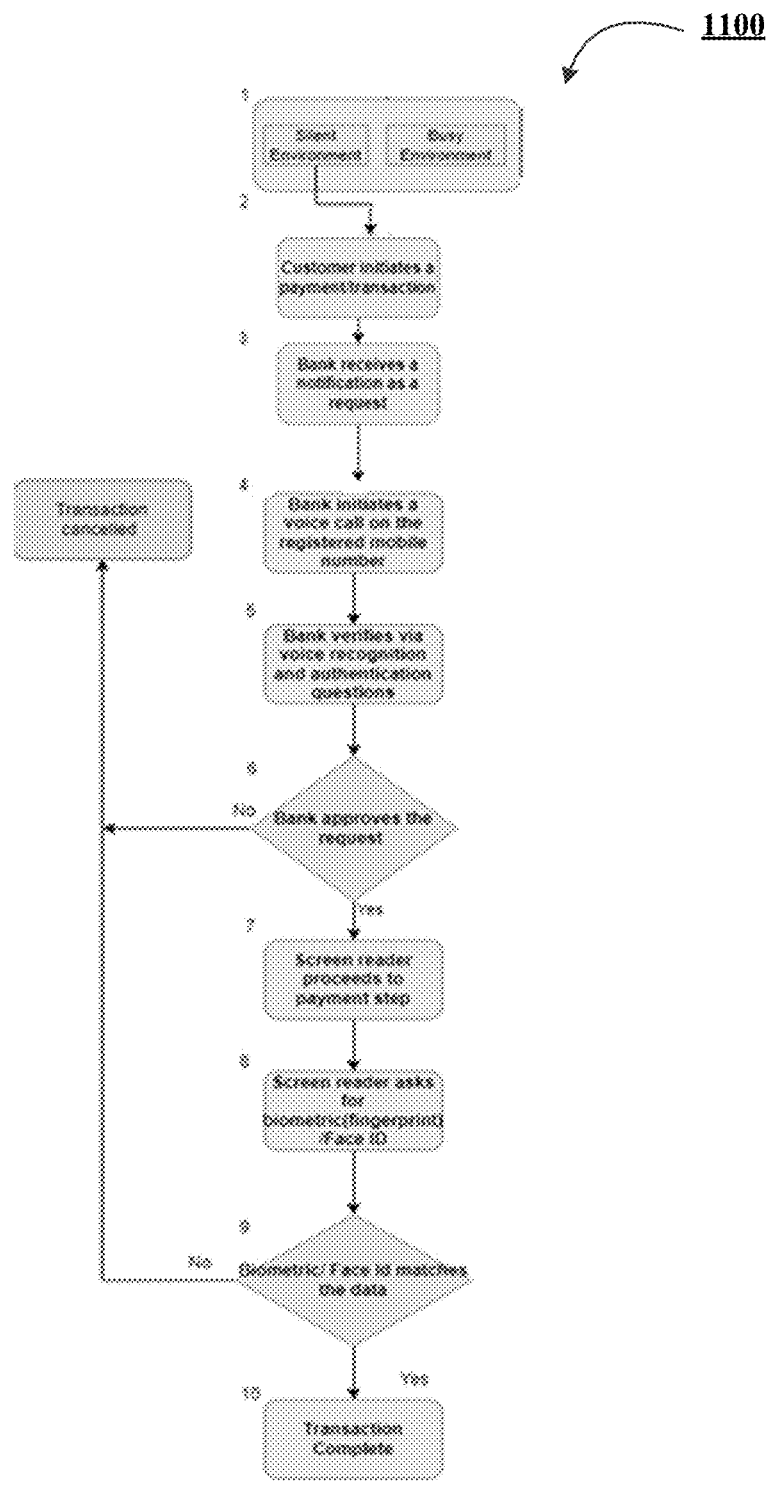
Figure 12:
Figure 13:

FIGS. 1A-1C illustrates technical components of an exemplary distributed computing environment for improving data security by generating surrounding image sonification and dynamically adjusting graphical user interfaces, in accordance with an embodiment of the disclosure;

FIG. 2 illustrates an exemplary machine learning (ML) subsystem architecture, in accordance with an embodiment of the disclosure;

FIG. 3 illustrates an exemplary Natural Language Processing (NLP) subsystem architecture, in accordance with an embodiment of the disclosure;

FIG. 4 illustrates a process flow for improving data security by generating surrounding image sonification and dynamically adjusting graphical user interfaces, in accordance with an embodiment of the disclosure;

FIG. 5 illustrates a process flow for improving data security by generating surrounding image sonification and dynamically adjusting graphical user interfaces including the transmission of real-time geographic environment indication and authentication the data transmission request based on a real-time environment authentication, in accordance with an embodiment of the disclosure;

FIG. 6 illustrates a process flow for generating a customized user interface template for the user of the user device, in accordance with an embodiment of the disclosure;

FIG. 7 illustrates a process flow for updating the real-time geographic environment indication based on objects selected in the user interface of the user device, in accordance with an embodiment of the disclosure;

FIG. 8 illustrates a process flow for allowing or blocking the data transmission request based on a crowd negative indication or a crowd positive indication, in accordance with an embodiment of the disclosure;

FIG. 9 illustrates a technical process flows for improving data security by generating surrounding image sonification and dynamically adjusting graphical user interfaces, in accordance with an embodiment of the disclosure;

FIG. 10 illustrates a technical process flow for an exemplary use case comprising a busy environment for the user device and the user, in accordance with an embodiment of the disclosure;

FIG. 11 illustrates a technical process flow for an exemplary use case comprising a silent/non-busy environment for the user device and the user, in accordance with an embodiment of the disclosure;

FIG. 12 illustrates exemplary graphical user interfaces configured on a user device for receiving a data transmission request and authenticating the user of the user device, in accordance with an embodiment of the disclosure; and FIG. 13 illustrates exemplary graphical user interfaces configured on a user device for authenticating the user of the user device and allowing the data transmission request, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

In our current technology environment, more and more communication actions are now undertaken by users on their user devices at remote locations, rather than in an in-person location. Further, and based on these remote locations, it has become increasingly easy for bad actors to act as eavesdroppers in these telecommunications, gather secure data, and interfere in secure data transmissions. Such issues are further exacerbated when trusted users are not sure if their environments are safe from bad actors (such as those users that have visual or auditory incapacities and cannot tell if their environment is safe and secure based on their own view or listening capabilities) and thus, whether greater security should be given to prevent secure data misappropriations. Thus, there exists a great need for a system that can accurately, efficiently, and dynamically improve data security by generating surrounding image sonification of the current environment for a trusted user and then, based on whether the environment is trustworthy, dynamically adjust graphical user interfaces of the user's user device to prevent eavesdropping of bad actors, data misappropriation, and/or the like.

Accordingly, the disclosure provides for the receipt of a data transmission request and at least one authentication credential; the identification of a voice input, facial input data, and a physical characteristic input data captured from a user device associated with the data transmission request; the comparison, based on the at least one authentication credential, the voice input with a voice authentication, of the facial input data with a facial authentication data, and the physical characteristic input data with a physical characteristic authentication; and the authentication of a user associated with the at least one authentication credential based on the comparison. Further, the disclosure provides for the receipt an expected environment user input from the user device, wherein the expected environment user input is based on a real-time geographic environment of the user device; the receipt of at least one real-time image of the real-time geographic environment from the user device; the analysis of the at least one real-time image; and the generation, based on the analysis of the at least one real-time image, of a real-time geographic environment indication of the real-time environment. Additionally, the disclosure provides for the transmission of the real-time geographic environment indication to the user device; the receipt of a real-time environment authentication from the user device; and the authentication of the data transmission request based on the authentication of the user and based on the real-time environment authentication.

In other words, the disclosure provides a system comprising an artificial intelligence based component on a user's smart device/mobile device which is configured to help visually, or auditory impaired users interact with their smart device, interact with applications on the smart device, and protect the user from potential bad actors eavesdropping on their interactions with the smart device. For instance, the disclosure may comprise a swipe gesture based user interface which is configured to receive swipes or touchscreen inputs from the user indicating what kind of environment the user believes themselves to be in currently (e.g., busy, crowded, silent, empty, and/or the like), whereby such an input indicating the user's belief for their environment may be compared against an image sonification of images captured by the smart device around the user (such as 180 degree images, 360 degree images, and/or the like). Additionally, the invention may provide an authentication module to help the user login to their applications via multi-factor authentication (three-factor authentication using physical characteristics, facial characteristics, and voice recognition). In an instance where the user's current environment is deemed too busy, and the user does not want to proceed with their intentions within the application (such as proceed with submitting a resource transmission), then the invention may automatically cancel or block the application from completing the originally intended process. However, and in an instance where the user is happy with the environment for proceeding with the originally intended process, then the invention may continue with the process in the application. Additionally, and in some embodiments, the invention may further comprise computer vision and machine learning techniques for further refining and fine-tuning the process of determining the current environment around the user and sonifying the images around the user based on low-level color information to high-level object recognition. In some embodiments, the invention may further comprise a user interface screen module which is configured with a machine learning model trained with historical user interactions with their device(s) and the user interfaces generated and configured in those historical interactions to adjust data as it is shown on the user interface of the smart device (e.g., adjust font size, color, location, and/or the like) to best show the user the underlying data for consumption.

What is more, the present disclosure provides a technical solution to a technical problem. As described herein, the technical problem includes determining safe and secure environments for data presentations and data transmissions. The technical solution presented herein allows for accurately, efficiently, and dynamically improving data security by generating surrounding image sonification of the current environment for a trusted user and then, based on whether the environment is trustworthy, dynamically adjust graphical user interfaces of the user's user device to prevent eavesdropping of bad actors, data misappropriation, and/or the like. In particular, the disclosure provided herein is an improvement over existing solutions to the data security which may dynamically change regularly as the environment of the user and their user devices changes, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for improving data security by generating surrounding image sonification and dynamically adjusting graphical user interfaces 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset. The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates an exemplary Natural Language Processing (NLP) subsystem architecture 300, in accordance with an embodiment of the disclosure. The NLP subsystem 300 may include a data acquisition engine 302, data ingestion engine 310, data pre-processing engine 316, NLP model tuning engine 322, inference engine 336, and NLP engine 351.

The data acquisition engine 302 may identify various internal and/or external data sources to generate, test, and/or integrate new features for training the NLP engine 351 (such as by gathering at least one unstructured datasets like that shown in as datasets 306). These internal and/or external data sources 304, 306, and 308 may be initial locations where the data originates or where physical information is first digitized (such as within a database, such as a database of change requests, modifications, and/or the like). The data acquisition engine 302 may identify the location of the data and describe connection characteristics for access and retrieval of data.

In some embodiments, data is transported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 304, 306, and 308 may include databases associated with computer programming modifications by development teams and their associated change requests that precipitated the modifications, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 302 from these data sources 304, 306, and 308 may then be transported to the data ingestion engine 310 for further processing.

Depending on the nature of the data imported from the data acquisition engine 302, the data ingestion engine 310 may move the data to a destination for storage or further analysis. Typically, the data imported from the data acquisition engine 302 may be in varying formats as they come from different sources, including RDBMS, other types of databases, S3 buckets, CSVs, or from streams. In some embodiments, and since the data may come from different places, it may need to be cleansed and transformed so that it can be analyzed together with data from other sources, such as by cleansing the data of non-important text such as periods (".") and/or the like. At the data ingestion engine 302, the data may be ingested in real-time, using the stream processing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In natural language processing, the quality of data and the useful information that can be derived therefrom directly affects the ability of the natural language processing engine 351. The data pre-processing engine 316 may implement advanced integration and processing steps needed to prepare the data for NLP execution. This may include modules to perform any upfront, data transformation to consolidate the data into alternate forms by changing the value, structure, or format of the data using generalization, weightage values, fuzzy the terms of the unstructured datasets, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. In some embodiments, the training data 318 may comprise pre-labeled modifications, natural language interpretations, and/or the like. Further, and in some embodiments, the training data 318 may be pre-labeled by users associated with the development team of the computer program(s) and/or by a user that input the change requests. Feature extraction and/or selection is a process of dimensionality reduction by which an initial set of data is reduced to more manageable groups for processing. In some embodiments, the training data 318 may require further enrichment. For example, in supervised learning, the training data is enriched using one or more meaningful and informative labels to provide context so the NLP engine 351 can learn from it. In contrast, unsupervised learning uses unlabeled data to find patterns in the data, such as inferences or clustering of data points, such as by being trained on non-labeled change requests and associated modifications.

An NLP engine tuning engine 322 may be used to train the NLP engine 351 using the training data 318 to make predictions or decisions without explicitly being programmed to do so. The NLP engine 351 represents what was learned by a selected machine learning algorithm 320 and represents the rules, numbers, and any other algorithm-specific data structures required for classification.

In some embodiments, the NLP engine 351 may include machine learning supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the NLP engine 351, the NLP tuning engine 322 may repeatedly execute cycles of experimentation, testing, and tuning to optimize the performance of the NLP engine 351 and refine the results in preparation for deployment of those results for consumption or decision making. To this end, the NLP tuning engine 322 may vary hyperparameters each iteration, run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 318. A fully trained NLP engine 351 is one whose hyperparameters are tuned and accuracy maximized.

The trained NLP engine 351, similar to any other software application output, can be persisted to storage, file, memory, or application, or looped back into the processing component to be reprocessed. More often, the trained NLP engine 351 is deployed into an existing production environment to make accurate decisions on unstructured data based on live data (e.g., unstructured datasets and input data). For instance, such an unstructured dataset/a plurality of future unstructured datasets may be input to the training NLP engine 351 (which includes parsing the terms of the unstructured dataset(s), determining the meaning of each of the modifications and their purposes within the computer program, the meaning of the change requests, and/or the like. Further, and based on the structured dataset generated by the trained NLP engine 351, the computer language interpretation system may generate an interface component (e.g., a modification interpretation database, and/or the like).

It will be understood that the embodiment of the NLP subsystem 300 illustrated in FIG. 3 is exemplary and that other embodiments may vary. As another example, in some embodiments, the NLP subsystem 300 may include more, fewer, or different components.

FIG. 4 illustrates a process flow 400 for improving data security by generating surrounding image sonification and dynamically adjusting graphical user interfaces, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400. In some embodiments, a machine learning model (e.g., such as the ML model shown in FIG. 2), and/or a natural language processing component (e.g., such as that shown and described in FIG. 3) may perform some or all of the steps described in process flow 400.

As shown in block 402, the process flow 400 may include the step of receiving a data transmission request and at least one authentication credential. For example, the system may receive and/or identify a data transmission request from a user device, whereby the data transmission request may refer to a resource transaction request and/or a secured data transmission request to access and/or transmit data from the user device to a secondary user device. For example, and in some embodiments, a data transmission request may comprise a request from the user device (such s by a user of the user device accessing an online banking platform or application) to access an account (such as a resource account on the online banking platform), to transmit a resource (such as transmit a resource associated with a resource account from or to the user's resource account associated with the user device), and/or the like. Thus, and by way of example, the system may track each of these accesses to an application associated with the system, and each of the events (e.g., the events associated with resource transmission requests, resource transmission receipts, access events of resource account(s), access events as the user interacts with each webpage or graphical user interface of the application and/or the like) within the application at the user device. In some such embodiments, the system described herein may be housed within the application at the user device. In some embodiments, the system may be housed separate from and outside of the application on the user device (e.g., the system may be stored on a client's network, where the client may manufacture, manage, and/or operate the application on the user device).

In some embodiments, the system may identify at least one authentication credential, which may comprise at least one of a username, account identifier, password, name of the user, and/or the like, which may be used by the system to uniquely identify the user. Thus, and in some embodiments, the authentication credential may precede the data transmission request (such as where a user may login to their application before submitting a data transmission request within the application) and/or the system may receive the authentication credential(s) with the data transmission request itself (such as where the same access event where an authentication credential is received is also the same access event where the data transmission request is generated and/or submitted).

As show in block 404, the process flow 400 may include the step of identifying a voice input, facial input data, and a physical characteristic input data captured from a user device associated with the data transmission request. For example, the system may identify at least one of a voice input, a facial input data, and/or a physical characteristic input data captured at the user device. For example, and where the system is stored within the application at the user device, then the system may itself identify the capture of the voice input, the facial input data, and/or the physical characteristic data as it is input to the user device within the application. In some embodiments and where the system is stored outside of the application, then the system may identify the voice input, facial input data, and physical characteristic input data at the user device in real time or in near real time as the data is captured at the user device.

As used herein, the voice input captured by user device comprises the voice data of the user as the user is speaking into their user device. Such voice input may be captured by a microphone integrated in the user device. Additionally, and in some embodiments, the voice input captured initially by the user device (e.g., via the microphone) may comprise background which may need to be filtered out to clarify the voice from the user associated with the user device. Thus, and in such embodiments, the background noise input may be filtered to identify the voice input, and the filtering of the background noise input may comprise a natural language processing (NLP) component configured with artificial intelligence which filters the one low-frequency sound, and divides a plurality of high-frequency sounds between a plurality of speakers in the background noise input to identify the voice input of the user. In other words, the NLP component may be configured for speech recognition to extract meaningful information and data from the audio picked up by the microphone of the user device, which can further recognize the words said and the context the terms are placed in. In some embodiments, the NLP component may comprise background noise suppression models which may remove low-frequency noise (such as low-pitched voices which may be further away from the microphone and other such background noises) and only allow the high-frequency noises for further filtering to determine the voice input associated with the user of the user device. In some such embodiments, the system may determine there are several people talking at the same time near the user of the user device and where each noise reads as a high-frequency noise, then the system may apply advanced noise detection methods which may comprise splitting the voices among different speakers, analyzing the voice inputs and data of each speaker, and determining which voice input matches previous instances of the user associated with the user device (e.g., based on pitch, pauses in speaking, terms used, cadence of words spoken, and/or the like). Thus, and in such an embodiment, the NLP component may accurately identify the voice input belonging to the user of the user device and capture each of the voice input data spoken by the user, while also filtering out background noise.

Further, and in some embodiments, the speech recognition described herein may be based on an automatic speech recognition (ASR) component, which may extract words from the voice input (including the background input data) and grammatical constructions from the voice input, process the voice input, and provide a response by the system based on the identified words spoken by the user of the user device (such as a system response of accessing a page within the application, an account within the application).

As used herein, the system may also identify facial input data, which may comprise the facial characteristics of the user, such as the spacing between the user's eyes, the length of the user's nose, the depth of the user's eye sockets, the distance from the user's forehead to chin, the shape of the user's cheekbones, the contour of the user's lips, ears, and chin, and/or the like. Thus, and in some embodiments, the user device may be configured with a camera or another image-capturing device to capture the image of the user in real time and/or near real time at the time of the data transmission request and/or throughout the process described herein.

Additionally, and in some embodiments, the system may identify physical characteristic input data based on the user device capturing the physical characteristic data with a scanning component (e.g., a fingerprint scanning component), a camera, a handheld device to capture fingerprint details, and/or the like. Thus, and in some embodiments, the physical characteristic input data may comprise a fingerprint captured from the user at the user device (or at a device configured and designed for capturing a fingerprint).

As shown in block 406, the process flow 400 may include the step of comparing, based on the at least one authentication credential, the voice input with a voice authentication, the facial input data with a facial authentication data, and the physical characteristic input data with a physical characteristic authentication. For example, and based on the capturing and/or identification of the voice input, the facial input data, and/or the physical characteristic input data, the system may compare each of these pieces of data to an authenticated version associated with the user of the user device (e.g., voice authentication, facial authentication data, and physical characteristics authentication, respectively) to determine whether to authentication the user currently using the user device as the authenticated user that is trusted to use the user device and access the user device's applications. Thus, and by way of example, the system may individually compare the voice input with an authenticated voice data (i.e., voice authentication) of the authenticated user of the device to determine if the voices match. Additionally, the system may compare the facial input data with an authenticated facial data (i.e., facial authentication data), to determine whether the facial features match. The system may also compare the physical characteristic input data (e.g., captured fingerprint data) to authenticated physical characteristic data (i.e., physical characteristic authentication comprising an authenticated fingerprint of the authenticated user) to determine if the physical characteristics match. As used herein, the term "comparison" refers to an examination of two objects (e.g., the voice input and the voice authentication, the facial input data and the facial authentication data, and the physical characteristic input data and the physical characteristic authentication) to identify the similarities and differences between the two objects. In some embodiments, and based on this comparison, the system may generate a percentage or value of comparison, and the greater the likeness between the objects, the higher the percentage or value of the comparison. Additionally, and in some such embodiments, the percentage or value of comparison may then be applied to a comparison threshold, where in an instance where the percentage or value of comparison meets or exceeds the comparison threshold, the system may determine the objects match.

In some embodiments, each of the authenticated user data for comparison with the voice input, facial input data, and the physical characteristic input data may be stored in a database linked to the system, and/or readily accessed by the system. In some embodiments, the application associated with the system (e.g., a digital banking application) may store the authenticated data for the user and the system may access the authenticated data within the application quickly and easily without requiring network communications to a remote database. Additionally, and in either instance for storing the authenticated user data may be accessed using the authentication credential(s) collected and identified at the start of this process, whereby the database may store and organize the authenticated user data with the at least one authentication credential which may be matched the recently-identified authentication credential(s) that was entered on the user device by the current user.

In some embodiments, only the voice input may be used at this step in the process described herein, such that the system may authenticate the user that has started the process described herein (e.g., generated and/or submitted the data transmission request) using the voice input and the voice authentication. Thus, and in some such embodiments, the system may initially identify the user using their voice input and the commands within their voice input data (e.g., "access account X" within the application, "move to next page" within the application, and/or the like) to move to the next step in the process described herein. Thus, and in some such embodiments, and upon identifying/authenticating the user using their voice input, the system may continue to the step of block 408.

As shown in block 408, the process flow 400 may include the step of authenticating a user associated with the at least one authentication credential based on the comparison. For instance, the system may authenticate the current user of the user device by comparing the input data (e.g., voice input data, facial input data, and/or physical characteristics input data) with the authenticated data of the user (e.g., voice authentication, facial authentication data, and/or physical characteristic authentication) which may be identified from a database based on the authentication credential captured and identified at the user device.

Thus, the system may determine the at least one input data matches with the associated authenticated data of the same time for the authenticated user before moving onto the next step described in block 410. However, and in an instance where the at least one input data does not match or the only input data compared at this instance (e.g., if only voice input data is the only input data compared with the authenticated data of the user-voice authentication), and the input data does not match the authenticated data, then the process may stop here and the current user may be blocked from the application in the user device.

As shown in block 410, the process flow 400 may include the step of receiving an expected environment user input from the user device, wherein the expected environment user input is based on a real-time geographic environment of the user device. For instance, the system may capture and identify a user input at the user device which identifies the expected environment (i.e., the real-time geographic environment of the user device) the user of the user device thinks they are currently in (e.g., a crowded/busy environment, an un-busy/secluded environment). In some instances, and where a user is visually or hearing impaired, it may be difficult for the user to accurately predict or determine their environment based on only their senses, and thus, help from their user device (such as help using the processes and components described herein) may be necessary for the user to gather information on their environment to make informed decisions on whether to move forward with secure data access and/or secure data transmissions.

Thus, and in some embodiments, the system may generate a graphical user interface (GUI) component to configure the user device's GUI to request a user input indicating the environment the user believes themselves to currently be in. Such a user input may comprise a voice input, a selection on the GUI for a clickable or selectable icon, and/or the like, whereby the input may indicate that the environment is "busy," "crowded," "loud," "silent," "secluded/not busy," and/or the like. Based on this expected environment user input, the system may collect images of the current user environment, analyze these images, and determine whether the expected environment input was correct or incorrect (e.g., if the user input "not busy" as the expected environment input, and the system-using the images of user device's environment-determines the real-time geographic environment is actually "busy/crowded," then the system may determine that the user attempting to access an account or complete a data transmission maybe unsecure and could potentially lead to eavesdropping by bad actors or misappropriation of secure data).

As shown in block 412, the process flow 400 may include the step of receiving at least one real-time image of the real-time geographic environment of the user device. For instance, the system may receive at least one real-time image of the real-time geographic environment the user device (and thus, the user) are currently in, based on the image(s) being captured by a camera on the user device. For example, the system may generate a GUI interface component comprising directions for the user to take pictures using their user device's camera of their environment (such as a plurality of pictures showing the 360 degree view of the environment around the user). Thus, and in some embodiments, the user may be directed to take at least one picture of their environment that they are currently facing, at least one picture of their environment to the left, at least one picture of their environment to their right, and/or at least one picture of their environment behind themselves. In some embodiments, the system may direct the user to take a video rather than a plurality of images, whereby the user may start a video and spin around in a circle from their start position until they reach their start position again. Then, and in such embodiments, the system may break the video into a plurality of images to show each frame of the video in individual images, which may then be analyzed by the system to analyze the real-time images individually and/or as a combination.

As show in block 414, the process flow 400 may include the step of analyzing the at least one real-time image. For instance, the system may analyze the real-time image(s) captured by the user device of the real-time geographic environment, whereby such an analysis may comprise the use of image sonification which may translate the information in the image(s) into sounds the user may understand (such as words used to describe the objects within the image(s)). Thus, and in some embodiments, the sonification may comprise a color sonification and a feature sonification of the at least one real-time image (e.g., a color sonification of the environment and an object sonification of the environment). In such embodiments, the images may be configured on the GUI of the user device, and the image sonification may be associated with each object identified within the image(s), such that as the user selects or "clicks" on the object in the image, the system—using the image sonification—may read aloud using the user device's speaker, a term or phrase to describe the object in the image. Such an embodiment is described in further detail below with respect to FIG. 7.

In some embodiments, and where the user has captured a video of their environment, the image sonification may be used in a similar manner, where the image sonification may be generated based on the image stream within the video.

In some embodiments, the system may comprise a computer vision component comprising machine learning capabilities which may be configured to analyze the images and generate the image sonification of the images on different levels. For example, the different levels for image sonification may comprise a sonification of low-level color information to high-level object recognition (e.g., humans, animals, buildings, and/or the like). Such a use of computer vision and machine learning capabilities (e.g., a machine learning model and/or a plurality of machine learning models) may overcome the limitations of manual object recognition based on low-level features, such as edges and colors (e.g., where a manual reviewer such as the user themselves may be unable to differentiate objects based on their colors and edges).

As shown in block 416, the process flow 400 may include the step of generating, based on the analysis of the at least one real-time image, a real-time geographic environment indication of the real-time environment. For instance, the system may generate a real-time geographic environment indication of the overall environment the user and their user device are currently in. Such a real-time geographic environment indication may be based on the totality of the images analyzed by the system, where based on all the images and their individual objects, the system may determine whether the environment is busy/crowded or secluded/not-busy (e.g., where may of the objects are humans or people, then the system may determine the environment is busy, and where not many human objects or no human objects are identified, then the system may determine the environment to be secluded). Thus, and as used herein, the real-time geographic environment indication may comprise a single attribute or identifier to describe the environment the user device (and the user) is currently in, such as a single attribute or identifier comprising "busy," "not busy," "crowded," "secluded," "loud," "quiet," and/or the like. Additionally, and in some embodiments, the real-time geographic environment indication may-after the real-time geographic environment indication has been generated-be read aloud by the user device using its speaker, such that a visually impaired user may be aware of their current environment. In some embodiments, and where a user is hearing impaired, but not visually impaired, the system may configure the GUI of the user device to show the real-time geographic environment indication.

FIG. 5 illustrates a process flow 500 for improving data security by generating surrounding image sonification and dynamically adjusting graphical user interfaces including the transmission of real-time geographic environment indication and authentication the data transmission request based on a real-time environment authentication, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500. In some embodiments, a machine learning model (e.g., such as the ML model shown in FIG. 2), and/or a natural language processing component (e.g., such as that shown and described in FIG. 3) may perform some or all of the steps described in process flow 500.

As shown in block 518, the process flow 500 may include the step of transmitting the real-time geographic environment indication to the user device. For example, the system may transmit the real-time geographic environment indication to the user device (and/or in an instance where the system is stored in the application of the user device, transmit within the user device to the speaker of the user device), such that the user device may use its components to indicate to the user the environment the user device (and the user) is currently. For example, the real-time geographic environment indication may-after the real-time geographic environment indication has been generated-be read aloud by the user device using its speaker, such that a visually impaired user may be aware of their current environment. In some embodiments, and where a user is hearing impaired, but not visually impaired, the system may configure the GUI of the user device to show the real-time geographic environment indication.

In some embodiments, the real-tie geographic environment indication may be transmitted to the user device and/or to another user device associated with the application or the system. For example, and where the application is an online banking platform, the system may transmit the real-tie geographic environment indication to an entity managing and/or operating the online banking platform, such that the entity may determine if the environment is safe for the data transmission request to be completed. In some embodiments, and where the environment is crowded, busy, or loud, then the entity may generate and send a block for the data transmission request back to the user device and prevent the data transmission request from being completed in the current environment.

As shown in block 520, the process flow 500 may include the step of receiving a real-time environment authentication form the user device. For instance, the system may receive a real-time environment authentication from the user device in response to transmitting the real-time geographic environment indication to the user device. For example, the real-time environment authentication may comprise a user input at the user device by the user accepting the real-time environment indication (e.g., accepting that the environment is busy, crowded, secluded, not busy, loud, or quiet). Additionally, and in some embodiments, the real-time environment authentication may comprise an indication that the user would like to continue with the data transmission request in spite of or based on the real-time geographic environment indication (e.g., where the real-time environment indication comprises an indication of "not busy," "secluded," "quiet," and/or the like, then the user may authenticate the real-time geographic environment and indicate that the user feels safe enough to continue with completing the data transmission request). Additionally, and/or alternatively, the real-time environment authentication may comprise an agreement that the real-time environment indication comprises an indication of "busy," crowded," "loud," and/or the like, and the real-time environment authentication comprises an indication from the user not continue with the completion of the data transmission request as it would be unsafe to do so.

In some embodiments, the real-time environment authentication may be received from the user device in real time or near real time to the transmission of the real-time geographic environment. In this manner, the real-time environment authentication may be current to the current environment that the system has already analyzed, instead of being outdated if the user moved environments between the user device receiving the real-time geographic indication and the user generating and transmitting the real-time environment authentication.

As shown in block 522, the process flow 500 may include the step of authenticating the data transmission request based on the authentication of the user and based on the real-time environment authentication. For example, the system may authenticate the data transmission request based on the authentication of the user (e.g., based on the voice input matching the voice authentication, based on the facial input data matching the facial authentication data, and based on the physical characteristic input data matching the physical characteristic authentication) and based on the real-time environment authentication (e.g., whereby the user has agreed, using the real-time environment authentication, to continue with the completion of the data transmission request and/or where the user has agreed not to continue with the data transmission request based on the real-time environment authentication). Such embodiment describing the different methods which may follow from the real-time geographic indication are described in further detail below with respect to FIG. 8.

FIG. 6 illustrates a process flow 600 for generating a customized user interface template for the user of the user device, in accordance with an embodiment of the disclosure. In some embodiments, a system (e.g., similar to one or more of the systems described herein with respect to FIGS. 1A-1C) may perform one or more of the steps of process flow 600. For example, a system (e.g., the system 130 described herein with respect to FIG. 1A-1C) may perform the steps of process 600. In some embodiments, a machine learning model (e.g., such as the ML model shown in FIG. 2), and/or a natural language processing component (e.g., such as that shown and described in FIG. 3) may perform some or all of the steps described in process flow 600.

In some embodiments, and as shown in block 602, the process flow 600 may include the step of applying the at least one authentication credential to a user interface machine learning model. For example, and in some embodiments, the system may apply the at least one authentication credential received from the user device to a user interface machine learning model, whereby the user interface machine learning model may be trained and configured to generate graphical user interfaces and graphical user interface components (e.g., components and widgets within a GUI) based on historical GUIs and GUI components used by the user associated with the authentication credential(s). Thus, and in some such embodiments where a user is visually impaired, the user interface machine learning model may use historical applications and their GUIs and GUI components to determine a preference of size for words in the GUI, a preference of fonts, a preference of location for a widget or graphic in the user device's GUI, and/or the like. Such preferences may allow for better visibility of the GUI for the specific user and their impairments. Additionally, and/or alternatively, the user interface machine learning model may additionally be trained on generating auditory or speaker components, which may be read aloud by the user device to indicate the same information as the GUI for those that may be blind or completely visually impaired.

Thus, and in some such embodiments, the user interface machine learning model may use the data of other applications stored in the user device and accessed by the user of the user device to determine historical preferences of the user interfaces (and/or speaker) for the user. For example, the at least one user interface preference may be based on historical user interfaces of a plurality of applications on the user device. Such data may be collected based on accessing the user device itself, and/or based on accessing historical user interfaces within the application itself and its user interfaces associated with the same authentication credential(s).

In some embodiments, and as shown in bock 604, the process flow 600 may include the step of determining, by the user interface machine learning model, at least one user interface preference for the at least one authentication credential. For example, the system may determine—using the trained user interface machine learning model—at least one user interface preference for the user device's GUI and/or speaker, such that the user of the user device may readily understand the information and data being shown on the GUI of the user device. For example, and in some embodiments, the at least one user interface preference may comprise at least one of a user interface location (e.g., a location of a widget, a word, a phrase, a graphic, and/or the like, in the GUI), user interface font, user interface size (e.g., letter and number size as compared to the overall size of the GUI), a interface auditory signal (e.g., a speaker indication of the information that would have been shown on the GUI), and/or the like.

In some embodiments, and as shown in block 606, the process flow 600 may include the step of generating, by the user interface machine learning model and based on the authentication of the data transmission request and the real-time environment authentication, at least one user interface template based on the at least one user interface preference. Thus, and based on these user interface preference(s), the system may generate at least one user interface in the application to show and/or describe to the user information of their surroundings, information regarding steps to complete their data transmission request, information on authenticating the user further (e.g., using facial recognition and/or fingerprint recognition), and/or the like. Therefore, and in other words, the at least one user interface preferences may be used to generate a template or a plurality of templates to configure each of only some of the user interfaces shown to the user during the process described herein. Such embodiments of example graphical user interfaces are shown and described in further detail below with respect to FIGS. 12 and 13.

FIG. 7 illustrates a process flow 700 for updating the real-time geographic environment indication based on objects selected in the user interface of the user device, in accordance with an embodiment of the disclosure. In some embodiments, a system (e.g., similar to one or more of the systems described herein with respect to FIGS. 1A-1C) may perform one or more of the steps of process flow 700. For example, a system (e.g., the system 130 described herein with respect to FIG. 1A-1C) may perform the steps of process 700. In some embodiments, a machine learning model (e.g., such as the ML model shown in FIG. 2), and/or a natural language processing component (e.g., such as that shown and described in FIG. 3) may perform some or all of the steps described in process flow 700.

In some embodiments, and as shown in block 702, the process flow 700 may include the step of receiving a real-time user image from the user device. For example, and in some embodiments, as the user may "click" (or select) on an object within an image on their user device and the object comprises an outline of a person, then the image sonification may read "person." Thus, and in other words, the users may be enabled to explore the image(s) actively on their user device and receive auditory feedback about the image content at their current finger position on their user device and an audible representation of color and space, may be generated and read aloud on the user device. Thus, users that may be blind, color blind, and/or the like, may understand their surroundings in real time or near real time before continuing with any secure data transmissions or secure account accesses.

In some embodiments, and as shown in block 704, the process flow 700 may include the step of updating, based on the real-time image user input, the real-time geographic environment indication and focus on an object in the at least one real-time image for the real-time geographic environment indication. For instance, the system may update, based on the real-time image user input, the real-time geographic environment indication that shows the overall environment of the user's geographic environment with respect to security may be updated to show or indicate the granular objects within the image(s) analyzed by the system. For example, and as a user inputs or clicks on objects within the real-time image(s), the system may update the real-time geographic environment indication to describe the object in detail and whether the environment, based on the object in the image(s), is safe for completing the data transmission request. Thus, and in some embodiments, the real-time geographic environment indication may comprise an indication that is shown or described using the user device (e.g., by configuring the GUI of the user and/or configuring the speaker of the user device) to indicate to the user the user's current environment either on a large scale (after analyzing each of the images/video, and/or on a granular scale, as the user selects objects within the image for analysis).

FIG. 8 illustrates a process flow 800 for allowing or blocking the data transmission request based on a crowd negative indication or a crowd positive indication, in accordance with an embodiment of the disclosure. In some embodiments, a system (e.g., similar to one or more of the systems described herein with respect to FIGS. 1A-1C) may perform one or more of the steps of process flow 800. For example, a system (e.g., the system 130 described herein with respect to FIG. 1A-1C) may perform the steps of process 800. In some embodiments, a machine learning model (e.g., such as the ML model shown in FIG. 2), and/or a natural language processing component (e.g., such as that shown and described in FIG. 3) may perform some or all of the steps described in process flow 800.

In some embodiments, and as shown in block 802, the process flow 800 may include the step of determining that the real-time geographic indication comprises a crowd negative indication. For example, the system may determine that the real-time geographic indication comprises a crowd negative indication (i.e., the environment is not busy, not crowded, and/or not loud). Thus, and in such an embodiments, the system may determine that the overall environment around the user device (and the user) are safe and secure to continue with completing the data transmission request.

In some embodiments, and as shown in block 803, the process flow 800 may include the step of allowing, based on the crowd negative indication, the data transmission request. Thus, and in some embodiments, based on the crowd negative indication, the system may automatically allow the data transmission request to be completed (e.g., the account to be accessed by the user device, the data transmission/resource transmission to be completed, and/or the like) as there is a minimal likelihood the data transmission will be eavesdropped, secure data will be collected misappropriated by individuals nearby, and/or the like.

In some embodiments, and as shown in block 804, the process flow 800 may include the step of determining that the real-time geographic indication comprises a crowd positive indication. Additionally, and/or alternatively to the description provided above with respect to blocks 802-803, the real-time geographic indication may comprise a crowd positive indication (i.e., the environment is busy, crowded, and/or loud), which may indicate that the environment is not secure, and the secure data of the data transmission request could be eavesdropped and/or misappropriated.

In some embodiments, and as shown in block 805, the process flow 800 may include the step of automatically blocking, based on the crowd positive indication, the data transmission request. Thus, and in some embodiments, in an instance where the real-time geographic indication comprises a crowd positive indication, the system may automatically block—in real time or near real time to determining the crowd positive indication—the data transmission request. In this manner, the system may automatically and dynamically block any secure data from being revealed to eavesdropping individuals and/or block any data transmission requests from being interfered with.

In some embodiments, and as shown in block 806, the process flow 800 may include the step of transmitting the real-time geographic indication based on the crowd positive indication to the user device. Additionally, and/or alternatively to the process described in block 805, the system may transmit the real-time geographic indication to the user device for further authentication of the user's environment (e.g., the user may decide whether to continue with the completion of the data transmission request despite the crowd positive indication).

In some embodiments, and as shown in block 807, the process flow 800 may include the step of receiving the real-time environment authentication based on the crowd positive indication, wherein the real-time environment authentication comprises a data transmission re-request from the user device. Thus, and in some embodiments, the system may receive a real-time environment authentication based on the crowd-positive indication, whereby the real-time environment authentication may comprise an agreement or understanding by the user of the user device that the environment may not be secure. Further, and in some embodiments, the real-time environment authentication may comprise a data transmission re-request which indicates that the user would like to continue with completing the data transmission request despite the insecure environment.

In some embodiments, and as shown in block 808, the process flow 800 may include the step of allowing the data transmission request based on the data transmission re-request. Thus, and based on the re-request in the real-time environment authentication, the system may allow the process to continue to complete the data transmission request.

FIG. 9 illustrates a technical process flows 900 and 950 for improving data security by generating surrounding image sonification and dynamically adjusting graphical user interfaces, in accordance with an embodiment of the disclosure. In some embodiments, a system (e.g., similar to one or more of the systems described herein with respect to FIGS. 1A-1C) may perform one or more of the steps of process flow 900. For example, a system (e.g., the system 130 described herein with respect to FIG. 1A-1C) may perform the steps of process 900. In some embodiments, a machine learning model (e.g., such as the ML model shown in FIG. 2), and/or a natural language processing component (e.g., such as that shown and described in FIG. 3) may perform some or all of the steps described in process flow 900.

For example, and as shown in technical process flow 900, the system may receive data transmission request from a user via a user device 140, and the system may determine that the user is visually or auditory impaired 901 based on the interactions of the user in a current instance, and/or past interactions and inputs of the user in historical instances. In some embodiments, the determination that the user is visually or auditory impaired may be based on the system comprising an artificial intelligence (AI) based utility on the user device and/or smart device, which may be trained on past and historical inputs and interactions by the user on the user device. Additionally, the system may use a swipe gesture based user interface to help the user interact within the application 902, whereby the swipe gestured based user interface may comprise interface components and/or widgets that are configured to help the user move easily and seamlessly through pages within the application (such as by swiping left and/or right in the GUI of the user device to move between pages in the application).

Further, and as shown in technical process flow 900, the system may comprise an authentication module, such as a multi-factor authentication, to help the user log into the application 903, which may comprise a multi-factor authentication of voice input data, facial input data, and/or physical characteristic input data, such that the user may be authenticated as the authenticated user of the user device and/or of the application. As shown in block 904, the technical process flow 900 may continue with an image (or images) sonification of the environment for the user to enable secure data transmission(s) and/or account access(es). Thus, and by way of example, the user may capture images using their user device's camera of the user's current geographic environment, and the system may be configured to analyze each image and each image's objects to generate an image sonification of the user's environment. Further, and as shown in block 905, the technical process flow may continue with a computer vision and machine learning technique which may be configured to provide a more detailed analysis of the images that were sonified for the user, such that the computer vision and machine learning model(s) are configured to provide a more in depth and granular analysis of the colors, edges, and objects within the image(s) or video(s).

Additionally, and as shown in block 906, the process may continue to customize the information of the environment to the user based on the image sonification and the computer vision/machine learning techniques, such that the user may gain an overall understanding of their environment and whether the environment is safe to complete their secure data transmissions/access secure accounts. In some such embodiments, the system may generate the real-time geographic environment indication of their current environment which may comprise an indication of "busy," "crowded," "not busy," "secluded," "not crowded," "loud," "quiet," and/or the like.

In some embodiments, and based on the customized information of the environment of the user, the process may continue to block 907 and/or block 908. For example, and in block 907, the system determine that the user feels safe (e.g., the environment is not crowded, not busy, secluded, not loud, and/or the like) with the environment, and thus, the data transmission completion windows and customized user interface templates (e.g., custom graphical user interfaces for the user) may be generated and used to complete the data transmission request. Additionally, and/or alternatively, and as shown in block 908, the system may determine that the user does not feel safe (e.g., the environment is crowded, loud, busy, and/or the like), and thus, the system could block the data transmission request from completion and block any further interactions within the application by the user.

In some embodiments, and as shown in technical process flow 950, the system may present user interface screens (e.g., GUIs and GUI components) that are customized based on the user's past or historical GUIs and GUI components, which may be generated by a trained user interface machine learning model. For example, and based on the customized information of the environment in block 906, the system may determine the environment is unsafe and thus, not allow the data transmission request or the customized user interfaces to upload in the GUI of the user device, and/or a safe environment the user interfaces may be customized to continue the data transmission request.

As shown in block 953, the technical process flow may continue with another multi-factor authentication based on the GUI screens chosen by the user and/or the GUIs chosen by the machine learning model, such that the system may determine if the user is the authenticated user of the user device based on the settings of the GUIs kept the same and/or changed. For example, and where the settings of the GUI are drastically changed (e.g., where the authenticated user historically has always had a font size of 24—or very large—for their GUIs and the user in the current instance changes the font size to 11—very small) then the system may determine that the user is different from the authenticated user. Additionally, and/or alternatively, the system may also receive and analyze facial input data and/or physical characteristic input data at this step in the process if it was not already done so in block 903 (e.g., where only voice input data was used for the authentication).

As shown in block 954, the technical process flow 950 may continue by using voice detection and background noise suppression models (e.g., like those described above with respect to FIG. 4) with ASR to filter out background noise and other voices that are not the authenticated user. Additionally, and based on the voice data filtered to identify the voice and commands of the authenticated user, the system may continue to block 955 to post that the secure authentication data transmission request is complete on the GUI's user device (i.e., upon completing the data transmission request based on the commands received from the voice input). Additionally, and/or alternatively, and as shown in block 956, the system may block the data transmission request automatically in an instance where the user cannot be authenticated based on an entity's multi-factor authentication standards (e.g., a banking entity's standards for authenticating the user).

Exemplary Use Cases

FIG. 10 illustrates a technical process flow 1000 for an exemplary use case comprising a busy environment for the user device and the user, in accordance with an embodiment of the disclosure. In some embodiments, a system (e.g., similar to one or more of the systems described herein with respect to FIGS. 1A-1C) may perform one or more of the steps of process flow 1000. For example, a system (e.g., the system 130 described herein with respect to FIG. 1A-1C) may perform the steps of process 1000. In some embodiments, a machine learning model (e.g., such as the ML model shown in FIG. 2), and/or a natural language processing component (e.g., such as that shown and described in FIG. 3) may perform some or all of the steps described in process flow 1000.

As shown in exemplary process flow 1000, when a user is determined to be in a crowded or busy environment, such as a visually impaired user in a crowded market or business who wants to make a payment or carry forward a resource transaction. The user may initiate a payment using their user device with the help of a screen reader. Additionally, and in some embodiments, an entity associated with the resource transaction (such as a financial institution) may receive a request as a notification, for the service selected by the user and the entity may initiate a voice call to the registered mobile number of the authenticated user associated with the user account (which may be the same number associated with the user's user device). In some such embodiments, and when the call is received at the user device, the system may implement a voice detection method and background noise suppression method for stable verification input from the user (e.g., such that the user's voice input may be filtered from background noise and other user's voices). Additionally, and in some embodiments, an automatic speech recognition (ASR) component may be used by the system to greater clarify the voice input from the user to complete a voice authentication. In some embodiments, the entity (such as the financial institution) may set acceptance standards and thresholds for the voice authentication, such that those voice inputs that are below the threshold will not be authenticated and the process will be blocked from continuing. In some embodiments, and where the voice input is not satisfying the criteria and standards for authentication, the entity may re-initiate the requests two or more times giving the user at least three chances to provide verification.

Further, and upon verifying the user on the call, and if the entity approves the initial request to continue with the data transmission request, the GUI of the user device may move to a next window or page within the application to continue with the data transmission request completion. For example, a next step may comprise a physical characteristic input authentication (e.g., fingerprint scanning of the user). In some embodiments, and where the first physical characteristic input does not meet the standard for authentication, the system may allow a second input of the physical characteristic input (e.g., fingerprint) for authentication.

Additionally, and upon authenticating the user based on the physical characteristic input, the system may configure the GUI of the user device to ask for facial input data from the user device (e.g., using a camera operatively coupled with the user device). In some such embodiments, the system may allow two attempts to verify the user with the faciail input data, but where the user cannot authenticate themselves within the two attempts, the system may automatically block the data transmission request process from continuing. In an instance where each of these multi-factor authentications are provided and authenticated, then the data transmission request may continue to completion.

FIG. 11 illustrates a technical process flow 1100 for an exemplary use case comprising a silent/non-busy environment for the user device and the user, in accordance with an embodiment of the disclosure. In some embodiments, a system (e.g., similar to one or more of the systems described herein with respect to FIGS. 1A-1C) may perform one or more of the steps of process flow 1100. For example, a system (e.g., the system 130 described herein with respect to FIG. 1A-1C) may perform the steps of process 1100. In some embodiments, a machine learning model (e.g., such as the ML model shown in FIG. 2), and/or a natural language processing component (e.g., such as that shown and described in FIG. 3) may perform some or all of the steps described in process flow 1100.

As shown in exemplary technical process flow 1100, the system may determine that the environment is uncrowded and secure/silent at an initial instance. Thus, and when a visually impaired user is in a secluded environment (such as a hospital, school, library, and/or the like) and may need to complete a transaction or resource transaction, access their secure account, and/or the like, then the user may initiate the data transmission request using their mobile application associated with their financial institution on their user device. The financial institution may then receive a notification request for the data transmission request and may initiate a voice call to the user on the user's registered number (such as the number associated with their user device). Such a call may comprise the voice input authentication of the user based on the user's voice input data collected, whereby the call may comprise requests for the user to answer such as "please confirm the amount of the resource transaction to be sent," "please confirm the recipient of the amount," "please confirm if the recipient is in a secured environment and able to proceed," and/or the like.

In some embodiments, the user may reply to the prompts in the call, and the system may collect and analyze the voice input data to authenticate the user. In some embodiments, and similar to the description provided above, the system may use voice detection methods, automatic speech recognition methods, and at least one NLP component to analyze the voice input data of the user.

In some embodiments, and upon authenticating the user with the voice input data, the system may determine if the entity has approved the data transmission request and the authentication of the voice input data. In an instance where the data transmission request has been approved based on the voice input data authentication, then the system may configure the GUI of the user device to proceed to the next step (e.g., physical characteristic input data collection and authentication), or the system may block the data transmission request from continuing (e.g., block the data transmission request process in an instance where the voice input data was not authenticated). In some embodiments, and upon authenticating the physical characteristic input data, the system may move onto facial input data collection and authentication.

In some embodiments, and once the physical characteristic and facial input data have been authenticated, then the system may configure the GUI to complete the data transmission request. Otherwise, and where the multi-factor authentication cannot be authenticated for each piece of data, then the system may configure the GUI to send the user back to the home screen of the application and block the data transmission request.

Exemplary Graphical User Interfaces

FIG. 12 illustrates exemplary graphical user interfaces configured on a user device 1200 for receiving a data transmission request and authenticating the user of the user device, in accordance with an embodiment of the disclosure. In some embodiments, a system (e.g., similar to one or more of the systems described herein with respect to FIGS. 1A-1C) may perform one or more of the steps to generate the exemplary graphical user interfaces 1200. For example, a system (e.g., the system 130 described herein with respect to FIG. 1A-1C) may perform the steps to generate the exemplary graphical user interfaces 1200. In some embodiments, a machine learning model (e.g., such as the ML model shown in FIG. 2), and/or a natural language processing component (e.g., such as that shown and described in FIG. 3) may perform some or all of the steps to generate the exemplary graphical user interfaces 1200.

As shown in user device 1201 with a configured graphical user interface, the system may configure the GUI to allow a user to input their authentication credentials, select a service (such as a data transmission request data), and/or the like. Upon receiving a user input at the user device within the application, the system may continue to configure the GUI of the user device to show an outgoing or incoming voice call to the user 1202, which may be used to authenticate the user using the voice input data. Upon authenticating the user with the voice input data, the system may configure the GUI of the user device to indicate that the voice authentication was approved 1203.

FIG. 13 illustrates exemplary graphical user interfaces configured on a user device 1300 for authenticating the user of the user device and allowing the data transmission request, in accordance with an embodiment of the disclosure. In some embodiments, a system (e.g., similar to one or more of the systems described herein with respect to FIGS. 1A-1C) may perform one or more of the steps to generate the exemplary graphical user interfaces 1300. For example, a system (e.g., the system 130 described herein with respect to FIG. 1A-1C) may perform the steps to generate the exemplary graphical user interfaces 1300. In some embodiments, a machine learning model (e.g., such as the ML model shown in FIG. 2), and/or a natural language processing component (e.g., such as that shown and described in FIG. 3) may perform some or all of the steps to generate the exemplary graphical user interfaces 1300.

As shown in user device 1301, and upon authenticating the user with their voice input data (e.g., user device GUIs 1202 and 1203), the system may configure the GUI of the user device to request at least one of a facial input data and/or physical characteristics input data (e.g., touch identification) to authenticate the user. In some embodiments, the facial input data and authentication may occur before the physical characteristic input data and authentication. In some embodiments, the physical characteristic input data and authentication may occur before the facial input data and authentication.

As shown in configured GUI 1302, the system may configure the GUI of the user device to show that the data transmission request was completed upon authenticating the user with the multi-factor authentication methods (e.g., voice input data, facial input data, and physical characteristic input data).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for improving data security by generating surrounding image sonification and dynamically adjusting graphical user interfaces, the system comprising:
  a memory device with computer-readable program code stored thereon;
  at least one processing device operatively coupled to the at least one memory device and the at least one communication device, wherein executing the computer-readable code is configured to cause the at least one processing device to:
  receive a data transmission request and at least one authentication credential;
  identify a voice input, facial input data, and a physical characteristic input data captured from a user device associated with the data transmission request;
  compare, based on the at least one authentication credential, the voice input with a voice authentication data, the facial input data with a facial authentication data, and the physical characteristic input data with a physical characteristic authentication data;
  authenticate a user associated with the at least one authentication credential based on the comparison;
  receive an expected environment user input from the user device, wherein the expected environment user input is based on a real-time geographic environment of the user device;
  receive at least one real-time image of the real-time geographic environment from the user device;
  analyze the at least one real-time image;
  generate, based on the analysis of the at least one real-time image, a real-time geographic environment indication of the real-time environment, wherein the real-time geographic environment indication comprises a sonification of the at least one real-time image;
  transmit the real-time geographic environment indication to the user device;
  receive a real-time environment authentication from the user device; and
  authenticate the data transmission request based on the authentication of the user and based on the real-time environment authentication.

2. The system of claim 1, wherein the sonification comprises a color sonification and a feature sonification of the at least one real-time image.

3. The system of claim 1, wherein executing the computer-readable code is further configured to cause the at least one processing device to:
  receive a real-time image user input from the user device; and
  update, based on the real-time image user input, the real-time geographic environment indication and focus on an object in the at least one real-time image for the real-time geographic environment indication.

4. The system of claim 1, wherein the analysis of the at least one real-time image comprises an analysis by a trained machine learning model and a computer vision component, and wherein the trained machine learning model comprises an objection recognition of the at least one real-time image based on a low-level color recognition and a high-level edge recognition of the at least one real-time image.

5. The system of claim 1, wherein the real-time geographic indication comprises a crowd negative indication, and wherein executing the computer-readable code is further configured to cause the at least one processing device to:
  allow, based on the crowd negative indication, the data transmission request.

6. The system of claim 1, wherein the real-time geographic indication comprises a crowd positive indication, and wherein executing the computer-readable code is further configured to cause the at least one processing device to:
  automatically block, based on the crowd positive indication, the data transmission request.

7. The system of claim 1, wherein the real-time geographic indication comprises a crowd positive indication, and wherein executing the computer-readable code is further configured to cause the at least one processing device to:
  transmit the real-time geographic authentication based on the crowd positive indication to the user device;
  receive the real-time environment authentication based on the crowd positive indication, wherein the real-time environment authentication comprises a data transmission re-request from the user device; and
  allow the data transmission request based on the data transmission re-request.

8. The system of claim 1, wherein a background noise input is filtered to identify the voice input, and wherein the filtering of the background noise input comprises a natural language processing component configured with artificial intelligence which filters at least one low-frequency sound, and divides a plurality of high-frequency sounds between a plurality of speakers in the background noise input, and identify the voice input of the user.

9. The system of claim 1, wherein executing the computer-readable code is further configured to cause the at least one processing device to:
  apply the at least one authentication credential to a user interface machine learning model;
  determine, by the user interface machine learning model, at least one user interface preference for the at least one authentication credential, wherein the at least one user interface comprises at least one of a user interface location, user interface font, user interface size, or user interface auditory signal, and wherein the at least one user interface preference is based on historical user interfaces of a plurality of applications on the user device; and
  generate, by the user interface machine learning model and based on the authentication of the data transmission request and the real-time environment authentication, at least one user interface template based on the at least one user interface preference.

10. A computer program product for improving data security by generating surrounding image sonification and dynamically adjusting graphical user interfaces, the computer program product comprising a non-transitory computer-readable medium comprising code causing an apparatus to:
  receive a data transmission request and at least one authentication credential;
  identify a voice input, facial input data, and a physical characteristic input data captured from a user device associated with the data transmission request;
  compare, based on the at least one authentication credential, the voice input with a voice authentication data, the facial input data with a facial authentication data, and the physical characteristic input data with a physical characteristic authentication data;
  authenticate a user associated with the at least one authentication credential based on the comparison;

receive an expected environment user input from the user device, wherein the expected environment user input is based on a real-time geographic environment of the user device;

receive at least one real-time image of the real-time geographic environment from the user device;

analyze the at least one real-time image;

generate, based on the analysis of the at least one real-time image, a real-time geographic environment indication of the real-time environment, wherein the real-time geographic environment indication comprises a sonification of the at least one real-time image;

transmit the real-time geographic environment indication to the user device;

receive a real-time environment authentication from the user device; and authenticate the data transmission request based on the authentication of the user and based on the real-time environment authentication.

11. The computer program product of claim 10, wherein the sonification comprises a color sonification and a feature sonification of the at least one real-time image.

12. The computer program product of claim 10, the computer program product further comprising non-transitory computer-readable medium comprising code causing an apparatus to:

receive a real-time image user input from the user device; and update, based on the real-time image user input, the real-time geographic environment indication and focus on an object in the at least one real-time image for the real-time geographic environment indication.

13. The computer program product of claim 10, the computer program product further comprising non-transitory computer-readable medium comprising code causing an apparatus to:

apply the at least one authentication credential to a user interface machine learning model;

determine, by the user interface machine learning model, at least one user interface preference for the at least one authentication credential, wherein the at least one user interface comprises at least one of a user interface location, user interface font, user interface size, or user interface auditory signal, and wherein the at least one user interface preference is based on historical user interfaces of a plurality of applications on the user device; and generate, by the user interface machine learning model and based on the authentication of the data transmission request and the real-time environment authentication, at least one user interface template based on the at least one user interface preference.

14. A computer implemented method for improving data security by generating surrounding image sonification and dynamically adjusting graphical user interfaces, the computer implemented method comprising:

receiving a data transmission request and at least one authentication credential;

identifying a voice input, facial input data, and a physical characteristic input data captured from a user device associated with the data transmission request;

comparing, based on the at least one authentication credential, the voice input with a voice authentication data, the facial input data with a facial authentication data, and the physical characteristic input data with a physical characteristic authentication data;

authenticating a user associated with the at least one authentication credential based on the comparison;

receiving an expected environment user input from the user device, wherein the expected environment user input is based on a real-time geographic environment of the user device;

receiving at least one real-time image of the real-time geographic environment from the user device;

analyzing the at least one real-time image;

generating, based on the analysis of the at least one real-time image, a real-time geographic environment indication of the real-time environment, wherein the real-time geographic environment indication comprises a sonification of the at least one real-time image;

transmitting the real-time geographic environment indication to the user device;

receiving a real-time environment authentication from the user device; and authenticating the data transmission request based on the authentication of the user and based on the real-time environment authentication.

15. The computer implemented method of claim 14, wherein the sonification comprises a color sonification and a feature sonification of the at least one real-time image.

16. The computer implemented method of claim 14, further comprising:

receiving a real-time image user input from the user device; and updating, based on the real-time image user input, the real-time geographic environment indication and focus on an object in the at least one real-time image for the real-time geographic environment indication.

17. The computer implemented method of claim 14, further comprising:

applying the at least one authentication credential to a user interface machine learning model;

determining, by the user interface machine learning model, at least one user interface preference for the at least one authentication credential, wherein the at least one user interface comprises at least one of a user interface location, user interface font, user interface size, or user interface auditory signal, and wherein the at least one user interface preference is based on historical user interfaces of a plurality of applications on the user device; and generating, by the user interface machine learning model and based on the authentication of the data transmission request and the real-time environment authentication, at least one user interface template based on the at least one user interface preference.

* * * * *